United States Patent
Polla et al.

(10) Patent No.: US 6,592,591 B2
(45) Date of Patent: Jul. 15, 2003

(54) FOLDABLE LENS DELIVERY SYSTEM

(75) Inventors: Dennis L. Polla, Plymouth, MN (US); John A. Costin, Lorian, OH (US); Arthur G. Erdman, Plymouth, MN (US); David J. Peichel, Plymouth, MN (US)

(73) Assignee: Micro Medical Devices, Inc., Elyria, OH (US)

( * ) Notice: Subject to any disclaimer, the term of this patent is extended or adjusted under 35 U.S.C. 154(b) by 0 days.

(21) Appl. No.: 09/741,410

(22) Filed: Dec. 19, 2000

(65) Prior Publication Data

US 2001/0015593 A1 Aug. 23, 2001

Related U.S. Application Data

(63) Continuation of application No. 09/455,819, filed on Dec. 6, 1999, now Pat. No. 6,162,230, which is a division of application No. 09/038,889, filed on Mar. 11, 1998, now Pat. No. 6,042,587, which is a division of application No. 08/748,190, filed on Nov. 12, 1996, now Pat. No. 5,800,441, which is a continuation of application No. 08/326,907, filed on Oct. 21, 1994, now Pat. No. 5,607,433, which is a continuation-in-part of application No. 08/275,835, filed on Jul. 15, 1994, now Pat. No. 5,629,577.

(51) Int. Cl.[7] .................................................. A61F 9/00
(52) U.S. Cl. ..................................................... 606/107
(58) Field of Search ................................ 606/107, 207, 606/210; 128/898

(56) References Cited

U.S. PATENT DOCUMENTS

| | | | |
|---|---|---|---|
| 3,808,488 A | 4/1974 | Massa | 310/328 |
| 3,952,215 A | 4/1976 | Sakitani | 310/328 |
| 3,957,162 A | 5/1976 | Soderqvist | 310/328 X |
| 4,163,168 A | 7/1979 | Ishikawa et al. | 310/328 |
| 4,195,243 A | 3/1980 | Thaxter | 310/328 X |
| 4,422,002 A | 12/1983 | Binnig et al. | 310/328 |
| 4,454,441 A | 6/1984 | Taniguchi | 310/328 |
| 4,709,183 A | 11/1987 | Lange | |
| 4,736,131 A | 4/1988 | Fujimoto | |
| 4,754,185 A | 6/1988 | Gabriel et al. | 310/309 |
| 4,785,177 A | 11/1988 | Besocke | 310/328 X |
| 4,834,094 A | * 5/1989 | Patton et al. | 606/107 |
| 4,894,579 A | 1/1990 | Higuchi et al. | 310/328 |
| 5,036,245 A | 7/1991 | Ohnishi et al. | |
| 5,134,334 A | 7/1992 | Onishi et al. | |
| 5,140,215 A | 8/1992 | Yamaguchi | |
| 5,261,883 A | * 11/1993 | Hood et al. | 606/107 |
| 5,325,010 A | 6/1994 | Besocke et al. | 310/328 X |
| 5,437,678 A | * 8/1995 | Sorensen | 606/107 |
| 5,562,676 A | * 10/1996 | Brady et al. | 606/107 |

OTHER PUBLICATIONS

*Ultrasonics, Ferroelectrics, and Frequence Control* J.W. Judy, D.L. Polla, W.P. Robbins, IEEE Transactions, vol. 37 No. 5, pp. 428–437, Sep. 90.

* cited by examiner

Primary Examiner—Kevin T. Truong
(74) Attorney, Agent, or Firm—Fish & Richardson P.C.

(57) ABSTRACT

An automatic lens delivery device using a linear actuator which is specially adapted for low torque, low heat applications, and can be used to insert a lens into a user's eye. The linear actuator uses two semiconductor devices which are moved one relative to the other. The movable device pushes a push rod that delivers a lens.

7 Claims, 19 Drawing Sheets

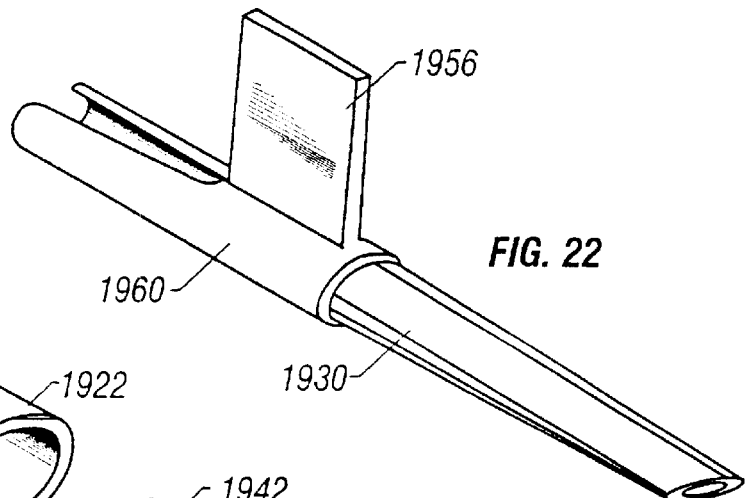
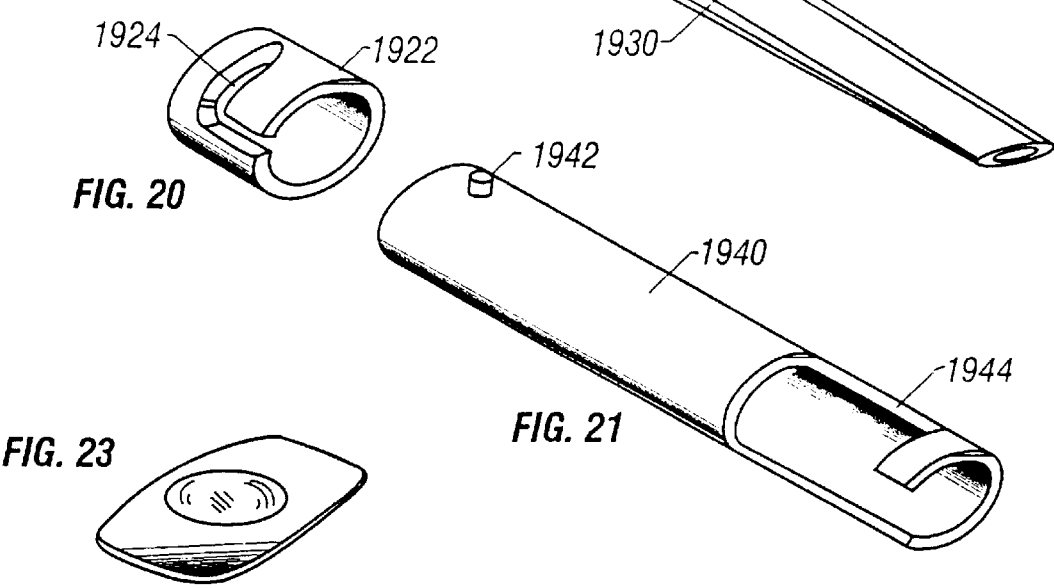
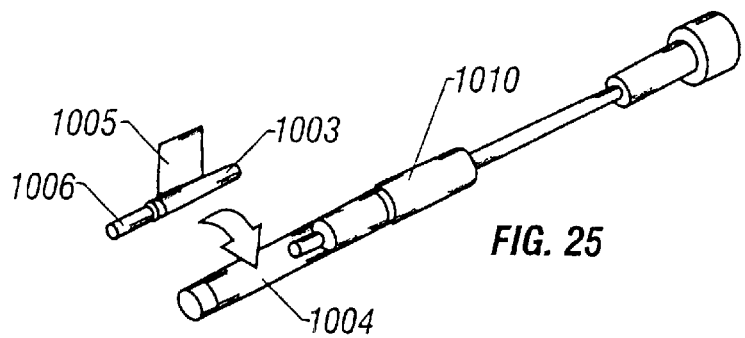

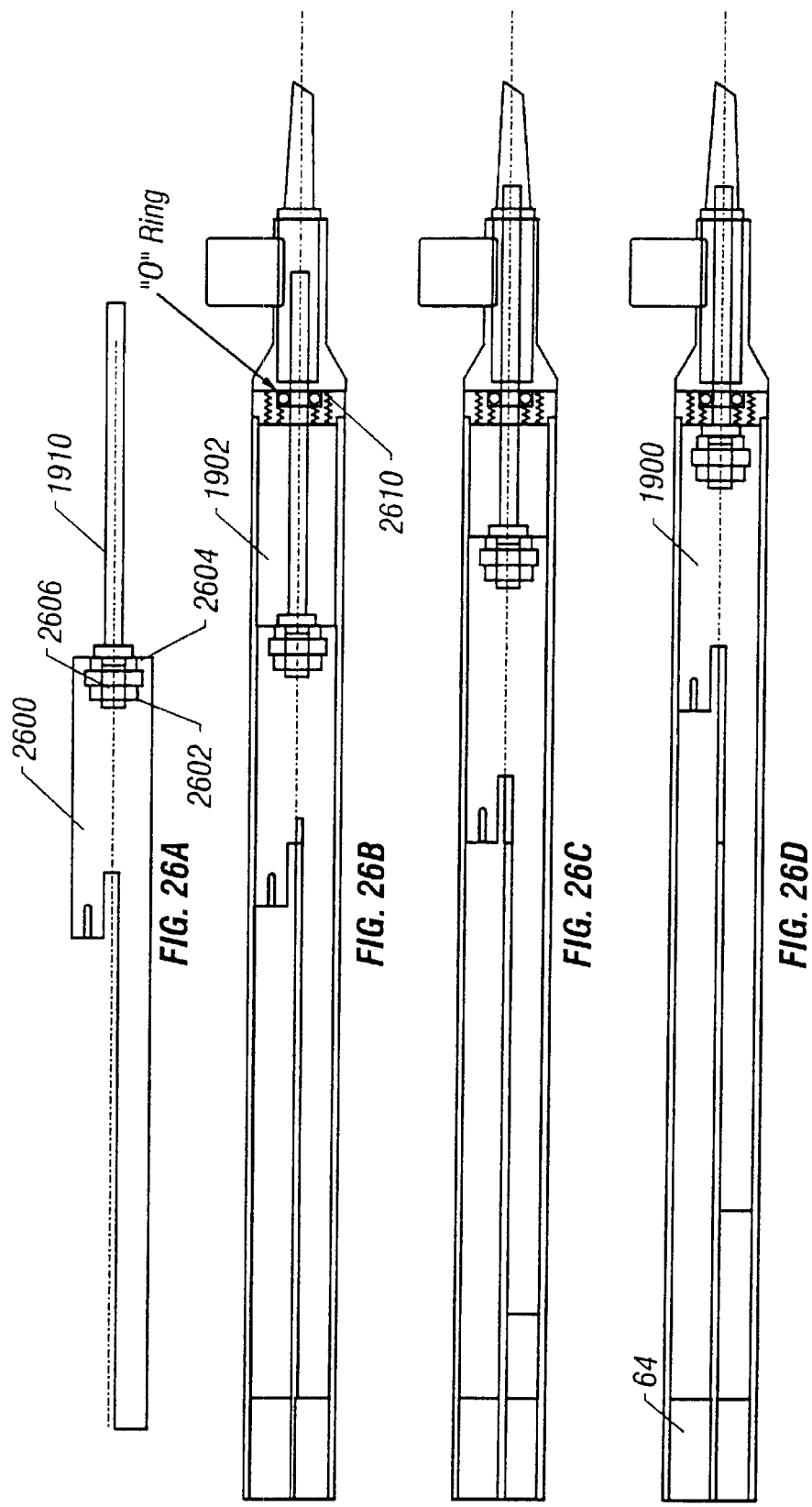

FOLDABLE LENS DELIVERY SYSTEM

This is a continuation of U.S. application Ser. No. 09/455,819, filed Dec. 6, 1999 now U.S. Pat. No. 6,162,230 which is a divisional of U.S. application Ser. No. 09/038,889, filed Mar. 11, 1998; now U.S. Pat. No. 6,042,587 which is a divisional of U.S. application Ser. No. 08/748,190 filed Nov. 12, 1996; now U.S. Pat. No. 5,800,441 which is a continuation of U.S. application Ser. No. 08/326,907, filed Oct. 21, 1994 (now U.S. Pat. No. 5,607,433); which is a continuation-in-part of U.S. application Ser. No. 08/275,835, filed Jul. 15, 1994 (now U.S. Pat. No. 5,629,577).

FIELD OF THE INVENTION

The present invention relates to a device for automatically delivering an intraocular lens into a patient's eye. More specifically, the present invention defines a device operating using an improved miniaturized linear stepper motor to deliver an intraocular lens into a patient's eye.

BACKGROUND AND SUMMARY OF THE INVENTION

A cataract is a hardened opaque portion on part of or all of the lens of an eye. Unchecked, a cataract could cause blindness and other complications. Cataract surgery is a procedure whereby the human lens is removed from the eye. In one method of cataract surgery, the hardened opaque lens is first fragmented and then aspirated out of the human eye.

A thin, delicate, clear membrane surrounds the lens. This membrane is left intact during this surgery, except for the opening in the front through which the cataractous lens is removed. Commonly, this sac is temporarily filled with viscoelastic material. Then an artificial lens to replace the human lens is inserted. This is referred to as an intraocular lens or IOL. Currently, the preference is to place the IOL in the hollow sac.

Phacoemulsification allows a surgeon to fragment and remove the cataract through a small incision in the eye. In recent years, there has been an interest in inserting the artificial implant lens into the eye through smaller and smaller wounds and even through the hole made for the phacoemulsification. This would allow replacement of the removed lens portion without enlarging the incision.

Cataract-replacing lens parts are commonly made of rigid polymethylmethacrylate (PMMA). The typical way to insert these lenses has been by using a blade or knife to enlarge the incision after the cataract has been removed and inserting the IOL. Since these IOLs are rigid, they require a larger incision. Larger incisions, however, require a longer recovery time and provide more probability of infection and more unstable post operative refractions. In more recent years, foldable intraocular lenses have been replacing rigid PMMA lenses.

Foldable lenses include three-piece looped designs, and a one piece plate design. The one-piece lens can be folded into a cylinder or a sphere. The folded lens can be inserted through the hole that has been used to remove the cataract ("the phaco hole"), into the eye. The artificial lens, if properly delivered, unfolds and takes the place of the removed human lens.

The artificial lens is often delivered as shown in FIG. 25. The folded lens 1000 is located in cassette 1002. The entire cassette, including the lens, is inserted into a chamber 1004 of the delivery device.

While looking through a microscope, the surgeon holds the handle part 1010, and inserts the end 1006 of the delivery device into the eye through the phaco hole. While still looking through the microscope, the surgeon reaches around with the other hand that is not holding the portion 1010 and actuates the control knob 1012. This actuation may be a screw movement or a pushing movement.

This puts the surgeon in an uncomfortable position while doing this crucial and exacting work. Specifically, the surgeon must operate the delivery device with both hands, one of which is placed in an unnatural and uncomfortable position due to an intervening optical microscope. In addition to the uncomfortable position, the surgeon's actuation of the control knob 1012 also may cause movement of the delivery end 1006 in the eye. These lenses, especially of the plate variety, must be inserted into the hollow sac occupied by the cataractous lens. This can produce a difficult situation, where the lens must be removed from the patient's eye or worse, can lead to serious postoperative vision problems.

Another problem is that sometimes the lens gets stuck as it leaves the cassette 1002, or the push rod jumps over the folded IOL and gets stuck half way out of the cassette. When this happens, the surgeon must decide how to remove the entire unit—possibly with a partially inserted lens—from the eye. The present invention, while not completely solving this problem, describes an arrangement which is far superior. The cassette can be easily detached from the inserter, leaving the IOL and cassette in the wound. Forceps can then be inserted and the IOL removed through the cassette without enlarging the wound or making other incisions to "lead" or pull the IOL out of the cassette, remove the cassette, then remove the IOL.

The inventors wondered why such a system had not been previously mechanized. They decided that there would be significant advantages to such a make a mechanized system.

The inventors found unexpectedly, however, that all commercially-available motors and actuators were unsuitable for the purpose. They found that rotary motors, e.g. those that produce a rotational force, were unsuitable in that they produced a torque on start up that could move the delivery tip, and hence increase failure rate. Also, most motors of this type were too large in size and mass, and would not fit within a conventional lens delivery device. The smaller motors that exist either could not produce enough force to push the IOL out of the cassette, or produced an unacceptable amount of heat which could cause danger for the surgeon or patient, or lacked very precise linear control. In addition, so-called micro motors are high speed and low torque. They require substantial gear reduction as well as conversion of rotary motion to linear displacement. This complexity adds to cost, increases weight and decreases reliability. If simply attached to the distal end of the device, it would be imbalanced. Linear actuators were also too large, not balanced, and consumed too much power.

To solve these problems, the inventors devised a special linear actuator that was small, balanced, produced no rotary torque, had a small power consumption, was very precise and controlled, and for the first time was practical for attachment to deliver a folded lens into an eye, through a small incision.

In view of the above, the inventors have invented a new method and apparatus for delivering an IOL into the eye. This technique uses a cassette-held folded lens, driven by a special linear actuator which produces virtually no torque on movement, produces very little heat and has a low weight. The preferred device uses the expansion and contraction of a member to deliver the force to press the lens along a path.

In addition, while doing so, the present invention obtains significant operational advantages.

The specific kind of linear actuator uses the shape change of piezoelectric materials that occurs when voltage is applied thereacross to generate linear motion.

BRIEF DESCRIPTION OF THE DRAWINGS

These and other aspects of the invention will now be described in detail with reference to the accompanying drawings, wherein:

FIG. 20 shows one attachment mechanism for the lens delivery device;

FIG. 21 shows a matched attached mechanism which attaches to the FIG. 20 device;

FIG. 22 shows the lens storage unit and its attachment tube;

FIG. 23 shows a flattened intraocular lens;

FIG. 24 shows a rolled intraocular lens;

FIG. 25 shows a lens delivery device which manually screws to deliver a lens; and FIGS. 26A–26D show a second embodiment of the invention.

DESCRIPTION OF THE PREFERRED EMBODIMENTS

A presently preferred embodiment will now be described in detail with reference to the accompanying drawings.

Figure 1:
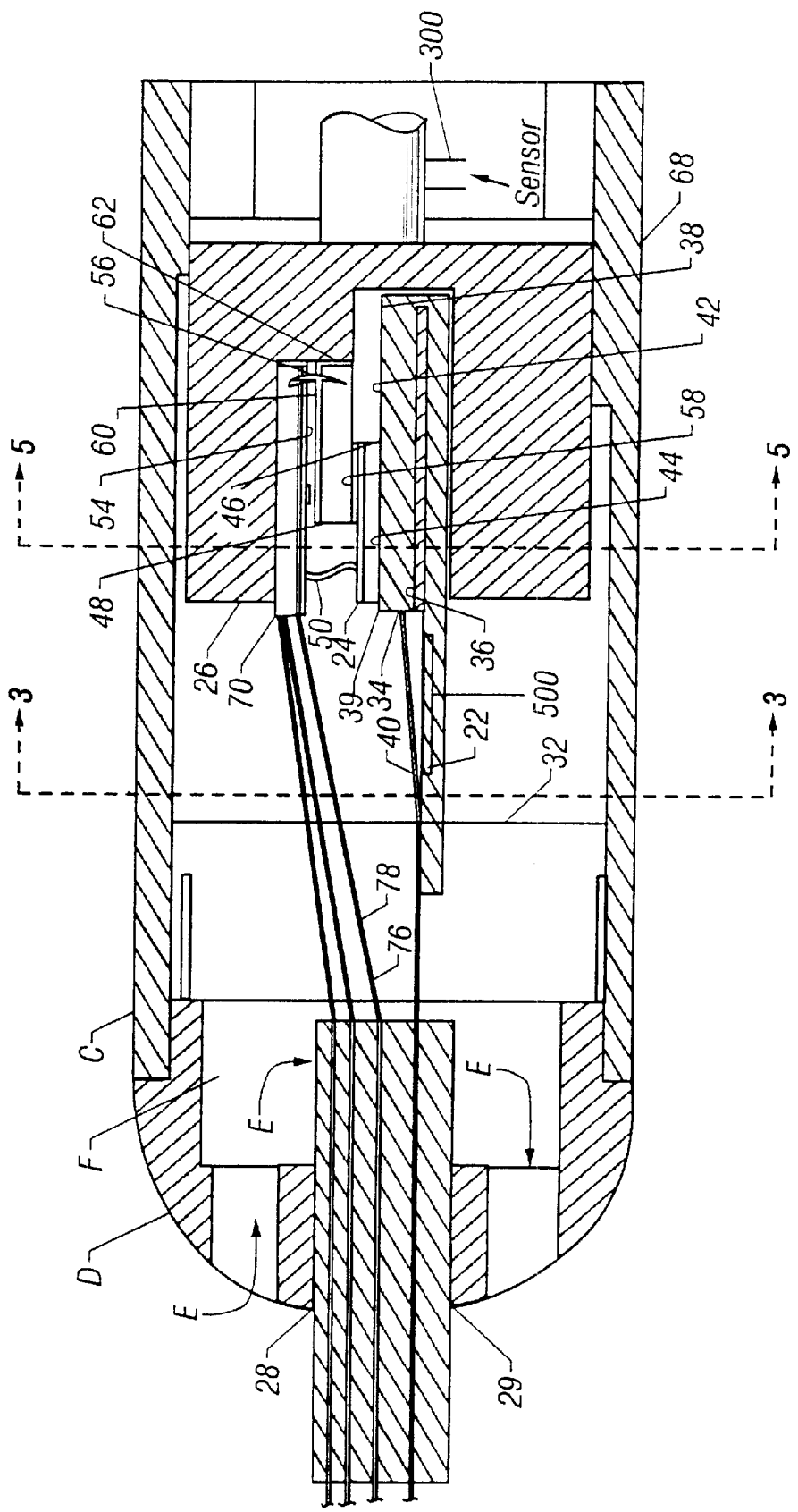
FIG. 1 is an enlarged, fragmentary, sectional view of a miniature linear motion actuator in accordance with the present invention, depicted within a support casing.

FIG. 1 shows a miniature linear actuator in accordance with a first embodiment of the present invention. The structure of the first embodiment has a base and a glider which are continuously clamped to one another, and wherein movement is effected by selectively overcoming the clamping force. The actuator is formed of a base 22, attached to the casing C, and a glider 24 which moves relative to the base, to provide force to a mass load 26.

The power for the operation is supplied over a plurality of wires 40, 76, 78, and 80 supplied as a control wire trunk 28. These wires are configured in a way that retains separation of the wires as the glider moves, to prevent electrical short circuits between the wires. Portions of these wires may be insulated to prevent any unintended short circuits. A more preferable technique is to use rigid wires as described herein.

The casing for the device is shown generally in FIG. 1 with the reference designation C, and refers to a part of the device which remains fixed and immobile. The casing is preferably cylindrical, and includes a plug 32 held in the cylinder. The base 22 includes support element 30 and wafer base 34 which is attached to support element 30 by epoxy or the like. A detailed drawing of the layers forming the actuator is found in FIG. 1A. Support element 30 is connected to the plug at a first end 31, and cantilevered therefrom at its other end. This connection of the support element 30 to the plug 32 prevents movement of the base in a direction parallel to the axial direction of the cylindrical casing. A top surface of the support element 30 is polished to have a surface height asperity of less than 1 $\mu$m/5 mm of linear length, and has an insulation layer 36 thereon to insulate between the support element 30 and the overlying wafer base 34. Insulation layer 36 is most preferably a native oxide.

The wafer base 34 is formed of silicon with an upper polished surface 38. Surface 38 is covered by an insulating layer 39 which is preferably a native oxide layer of $SiO_2$. Another layer of silicon nitride, $Si_3N_4$, layer 41, is preferably, but not necessarily, grown over native oxide layer 39. The $Si_3N_4$ layer helps stabilize the native oxide layer 39 and also physically strengthens the layer.

The resultant insulation layers 39, 41 are very smooth since they have been formed on the highly polished surface 38.

Any technique which is known in the semiconductor art can be used for forming the $SiO_2/Si_3N_4$ layers over the wafer base 34. The most preferred technique is to heat the surface of the silicon element in the presence of oxygen to form the native oxide layer thereon. This has the added advantage that the connection strength between the silicon and the insulation is very high. Less preferred techniques include sputtering and chemical vapor deposition of the oxide.

Wafer base 34 receives a potential through a wire 40 which is electrically connected therewith.

Glider 24 includes clamping wafer 46 and expandable member 48. The clamping wafer 46 is also preferably formed of silicon with a lower polished surface 44. An alternate embodiment of this invention forms the insulating layers 39, 41 on the polished surface 44 of the clamping wafer 46, instead of on the wafer base 38.

An insulating layer 52 is formed on the opposite surface of the clamping wafer 46, opposite the polished layer 44. Expandable member 48 is attached to insulating layer 52. A portion 49 of expandable member 48 is cantilevered with respect to the underlying support elements. Expandable member 48 is formed of a material which changes in size responsive to application of a stimulus thereto. More preferably, expandable member 48 expands and/or contracts in size based on an electric field applied thereto. The material which is currently preferred is a piezoelectric material, such as PZT. Another preferred material is the PZT material known as LTZ-2M, available from Transducer Products in Connecticut. Other materials could also be used, including a shape memory material such as nitinol, an electrostrictive material such as PLZT, or a magneto-restrictive element that changes its dimension in response to an appropriate magnetic field. Any material can be used, so long as it allows the expandable member 48 to increase and decrease in size relatively rapidly responsive to the application of a stimulus field.

The expandable member 48 is glued to the insulating layer 52 which overlies clamping wafer 46 by an epoxy adhesive. Electric lead wires 54 and 56 provide an electrical potential across the expandable member 48 to control its expansion and contraction.

Mass load 26 represents schematically the device which receives the output force produced by the movement of the glider relative to the wafer base. Mass load 26 includes a work interface rod 64 which is connected to the device which is intended to receive the payload. The expandable member 48 is preferably attached to mass load 26 is by an insulating bonding adhesive 60, such as epoxy. The movement of the glider assembly 24 is thereby translated into linear motion of the mass load 26. The mass load 26 is preferably of a shape to contact the interior surfaces of the cylindrical casing C and thereby maintain a seal within the cylinder. Workbase seal 66 seals between mass load 26 and casing C in order to prevent liquid leakage into the motor. Seal 66 can be an annular truncated cone, or an "O" ring seal.

In order to allow more sensitive control of the present invention, a sensor 300 may be placed in contact with the mass load. Sensor 300 could be a force sensor, accelerometer, or the like. The sensor can be wireless or wire-connected, and is used to provide feedback as described herein.

Force levels encountered at the distal tip are directly transmitted back to expanding member 48 and the interface between gliding wafer 46 and base wafer 34. Controller 120 may directly sense any load changes on work interface 64 from a workpiece through monitoring voltage, current and phase angle changes. Controller 120 can be programmed to automatically respond to these changes through feedback mechanisms to adjust one or more settings to adjust the glider waveform control, voltage amplitude, frequency control 132, expandable member waveform control 134, expandable member voltage control 136, expandable member frequency control 138, and phase control 126 as described. Thus, a specific force displacement relationship can be maintained within the power and mechanical limits of the system. It is also anticipated that other sensors may be added to the system to assist in feedback control of the present invention.

In operation, the device operates to produce motion as follows. It should be understood that while the explanation given herein is an explanation of forward motor motion, the opposite sense operation produces a reverse movement of the motor.

A first step of the operation provides a clamping force by applying an electrical force between clamping wafer 46 and wafer base 34. This clamping force is carefully controlled as explained herein such that it holds the position clamping member relative to the wafer base under most circumstances, including slow expansion of expandable member 48. The force is not so strong a force as to prevent separation between the clamping wafer 46 and wafer base when sufficient inertial force is applied thereto from maximum-speed contraction of expandable member 48. The clamping force is important since the clamping force must be sufficient to hold the connection between the wafers while pushing forward the mass load.

The clamping force is one of the important parts of this motor. It is well known from physics that an electrostatic clamping force is expressed as follows:

$$F_{clamp} = \frac{\epsilon A V^2}{x^2} \quad (1)$$

where $\epsilon$ is the dielectric constant of the insulating material, A is the surface area of the wafers, V is the voltage applied between the two wafers, and x is the separation between the two wafers. The separation between the wafers, of course, is the thickness of the insulating layer 39,41. Equation (1), therefore, shows that the clamping force is inversely proportional to the square of the thickness of the insulating layer that separates the base from the glider. As this thickness increases, the area of the clamping layers must increase proportionally as the square of this thickness. It can therefore be seen that a thicker insulation layer between the wafer base and the glider will necessitate that the wafer base and the glider be much larger in area to provide a comparable force.

The Judy et al. design used a teflon sleeve between the layers. This teflon sleeve was about 63.5 μm in thickness. In order to obtain sufficient clamping force between the base and glider, therefore, the surface areas of these two elements needed to be relatively large in comparison to the present invention.

In contrast, the present invention teaches using semiconductor materials, which allow the use of very thin insulating layers, e.g. 50 Å–2 μm in thickness. Silicon and other such materials can be very accurately processed using conventional semiconductor miniaturization techniques. This processing allows very thin insulating layers with a high degree of polish. While the insulating layers can be as thin as 50 Å, the preferred thickness for the insulating layer 42, according to the present invention, is 1 μm in thickness. This is almost two orders of magnitude thinner than the Judy et al. insulating layer, and therefore allows the resultant structure to be four orders of magnitude smaller (since the area is not a squared term, but the distance is) for a similar clamping force.

This reduced size for the same clamping force allows increased miniaturization.

Returning to operation, then, once the glider is clamped to the base with an appropriate amount of clamping force, the expandable member 48 is increased in length slowly, e.g., gradually over 1 ms. This increase in length pushes mass load 26 in the direction of the length increase. This slow increase does not overcome the clamping force between the glider and the base. The overall result is that the mass load is pushed forward by an amount proportional to the amount of expansion possible of the expandable member.

At this point, the voltage across the expandable member is quickly reduced, e.g. in 200–500 ns, to cause the expandable member to decrease in size in its minimum possible time. Inertial force from the fast contraction produces sufficient force between the glider and the wafer base to overcome the clamping force, and causes the glider to lift off from the wafer base. This overcomes the clamping force and moves the glider forward on the wafer base. The clamping force amount is explained in more detail herein, but it should be seen that the clamping force must set sufficiently high so that when the expandable member is increased in length slowly, the clamping force is sufficient to resist this force and maintain the position of the glider relative to the wafer. However, the clamping force is not sufficiently high that it will resist the inertia caused when the expandable member decreases in size at its maximum rate. This high inertia overcomes the inertial force and causes the glider 24 to move relative to the wafer base 34 against the force caused by the clamping. This completes the cycle of operation, and the next cycle is then initiated to move the mass load 26 further forward.

As can therefore be seen from the above, the present invention, by using semiconductor wafer materials and technology, allows the clamping wafers to be more closely spaced than was possible in the prior art. This increases the output force and velocity for a similarly sized device, and allows the device to be much smaller. In fact, the device of the present invention could be $63^2=3969$ times smaller than the Judy et al. device for similar force characteristics.

Another advantage of the present invention is obtained from the different mode of operation used according to the present invention. Judy et al. described that, during every cycle, the electrostatic clamp was turned off during the time when the glider was to be moved relative to the wafer base. However, during the time the clamp is turned off, the effects of gravity may affect the position of the glider relative to the base. This means that the device would operate differently depending on the position it was being held.

In contrast, the techniques of the present invention maintain the clamp force at all times. The present invention does not turn off the clamp, but instead appropriately sets the clamping force at an appropriate value that can be maintained constant. In a first mode of this first embodiment of the invention, the clamp voltage is maintained at a constant value. In a second mode of this embodiment, described in more detail herein, the clamping voltage varies cyclically. This cyclic variation removes accumulated charge in the substrate.

Any semiconductor material, as well as many metals, could be used for the clamping wafers. Crystalline silicon is the preferred material, however, since it is readily available, strong, easily able to form a native insulative layer of $SiO_2$ thereon and also easily processed using conventional semiconductor techniques. Amorphous or polycrystalline silicon could also be used. Germanium and gallium arsenide are also good materials, but are more brittle. They are usable, but less preferred. Also usable, but even less preferred, include silicon carbide, gallium nitride, and gallium phosphide. Metals also can be used, for example aluminum, but its native oxide is not reliable. A stainless steel thin film can be used, but the thin layer of oxide would need to be sputtered thereon. This forms a more granular surface. Copper, brass and gold could also be used.

The preferred process of making the device, therefore, includes obtaining a silicon wafer, polishing the surface to obtain a flat surface, growing the oxide by heating the surface in the presence of oxygen, and then forming the $Si_3N_4$ on the $SiO_2$ by a conventional chemical vapor deposition technique.

Figure 2:
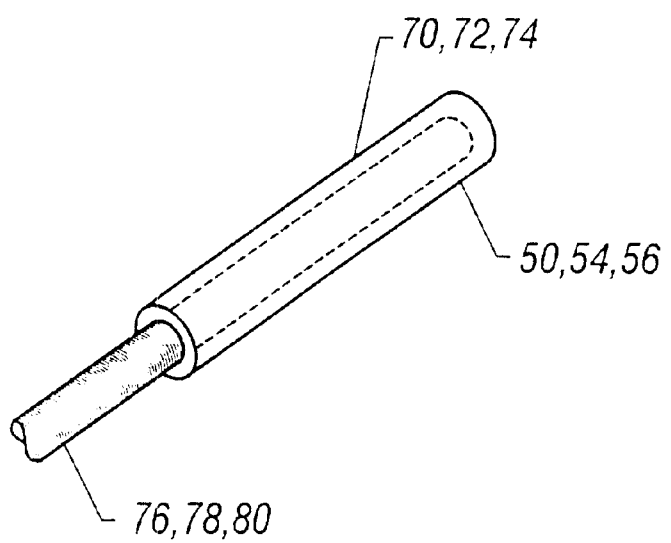
FIG. 2 is a fragmentary view of a sliding electrical contact wire.

FIG. 2 shows a detailed connection diagram of each of the wires 76, 78, 80 and their accompanying cylinders 70, 72, 74. Each of the wires 76, 78 and 80 are formed of a rigid rod, connected at one end through the control wire trunk 28, and having a fixed length. Each wire, e.g., 76, is of a length such that it will remain within its associated cylinder 70 at all possible glider positions. Each of the cylinders is connected by a lead wire, e.g., 50, to its connected location. Each of the wires 76, 78, 80 from the control wire trunk 28 are slightly smaller in outer diameter than the inner diameter of the cylinder, but include a kink 120 therein at which point they contact the inside of the cylinder. Therefore, the wires 76, 78, 80 contact the inside of their associated cylinder 70, 72, 74, and form a sliding connection as the expandable members move relative to one another. The wires slide relative to the cylinder during this time. The cylinder itself, however, does not move, and the connection 50 does not move.

Figure 3:
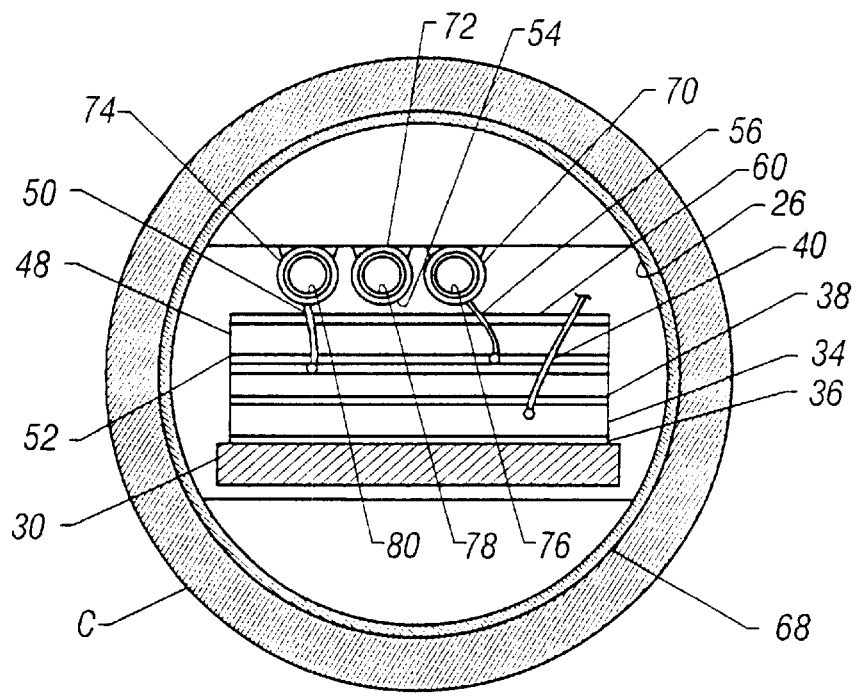
FIG. 3 is a sectional view taken along the line 3—3 of FIG. 1.

FIG. 3 shows a cross-sectional view along the line 3—3 in FIG. 1 showing the positions of the cylinders 70, 72 and 74 and their connections to the layers.

Figure 4:
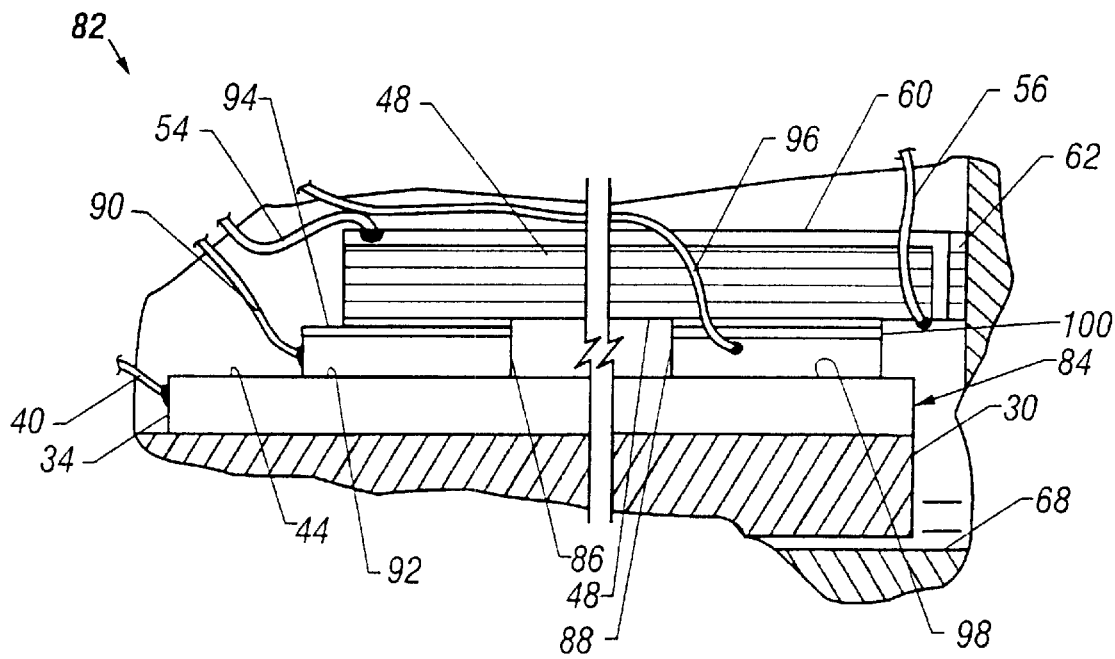
FIG. 4 is a fragmentary, detail view depicting a second embodiment of the invention which uses double clamping.

FIG. 4 shows a second embodiment of the present invention which is a linear actuator using a more conventional double-clamping technique. The FIG. 4 embodiment shows only a portion of the overall device, that portion being the part which differs from the portion of FIG. 1.

FIG. 4 includes a similar support member 30 and wafer base 34 with insulating layer 44 thereon.

The glider 84 of the FIG. 4 embodiment is totally different than the glider of the first embodiment. Glider 84 includes two separated pieces, including a proximal glider 86 and a distal glider 88. Each of the glider pieces include a respective lead wire, 90, 96 attached thereto. Each of the gliders also includes a bottom-most polished surface. The proximal glider 86 includes polished surface 92 and the distal glider includes polished surface 98. Each of these polished surfaces abuts against the insulating layer 39 on the wafer base, it being understood that the insulator could be similar to the insulator of FIG. 1, 1A and alternately could be formed on the bottom surface of the glider.

The operation of the system of FIG. 4 is somewhat different than the operation of the single clamping motor of FIG. 1. FIG. 4 uses a double clamping technique, whereby different glider portions are repetitively clamped, followed by expansion or contraction of the expandable element 48 to move it forward. The device can be moved in the direction to the right of FIG. 4 in the following way. First, the proximal glider 86 is clamped with the expandable member 48 in its maximally contracted position. The distal glider 84 is not clamped at this time. The expandable member 60 is then expanded to its maximum expansion state, thereby pushing the mass load 26 to the right of FIG. 4. At this time, the distal glider 84 is clamped, and the proximal glider 86 is released. The expandable member 60 is then returned to its contracted length to pull the proximal glider to the right in FIG. 4. At this time the proximal glider 86 is again clamped, and the cycle begins anew.

The FIG. 4 embodiment is highly miniaturizable due to the semiconductor materials that are used.

The movement of both embodiments of the invention are controlled by various parameters including voltage for clamping, voltage across the piezoelectric expandable elements, frequency of the repetitive voltage, and voltage waveform shape, i.e., change of voltage with respect to time.

Figure 5:
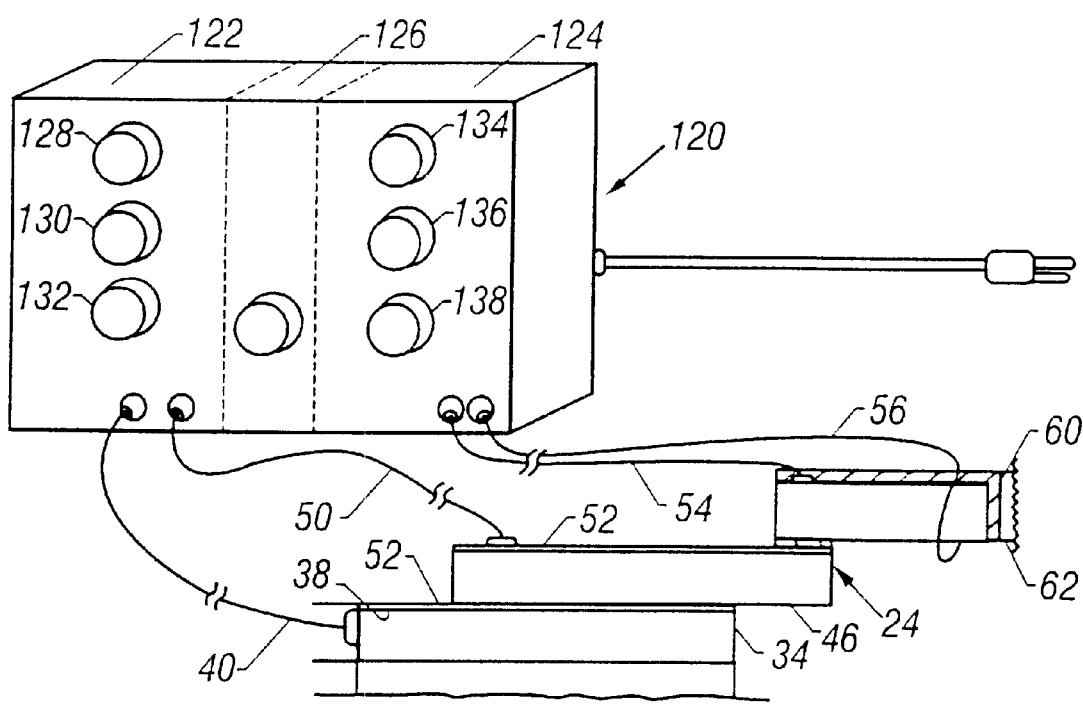
FIG. 5 is a simplified diagram depicting the control console and electrical connection to the elements of the miniature linear motion actuator in accordance with the present invention.

FIG. 5 shows the power control console 120 which controls the operation of these input parameters. Power control console 120 controls all voltages, frequencies and phases of the various elements.

The magnitude of the clamping voltage is adjusted to control the actuator operation according to desired characteristics. As explained above, the force between the base and glider is proportional to the amount of voltage used for clamping. Hence, the clamping voltage sets the base level of force holding together the glider and the base. When the expandable member expands, and pushes against the mass load, that mass load will only move forward if the force produced by pushing against the load does not overcome the clamping voltage between the glider and the base. Therefore, a clamping voltage must be set keeping in mind the load; too small a clamping voltage will not produce sufficient force to drive a specified load.

On the other hand, the clamping voltage must be overcome by the inertia of the expandable member contracting quickly. Too high a clamping voltage prevents the expandable member from snapping back sufficiently, and therefore shortens the step length.

As described above, the expandable member is repetitively expanded and contracted. The frequency of this expansion and contraction is based on physical characteristics of the system. The expandable member, for example, takes a certain amount of time to expand and to contract. In the embodiment described above, the expansion is done relatively slowly, e.g. 1 ms. The contraction occurs at the maximum possible speed of the material, but this also takes a certain finite amount of time, e.g. 250 ns. The frequency of the repetitive operation cannot be faster than the time which is physically necessary for these materials to expand and contract.

Figure 18:
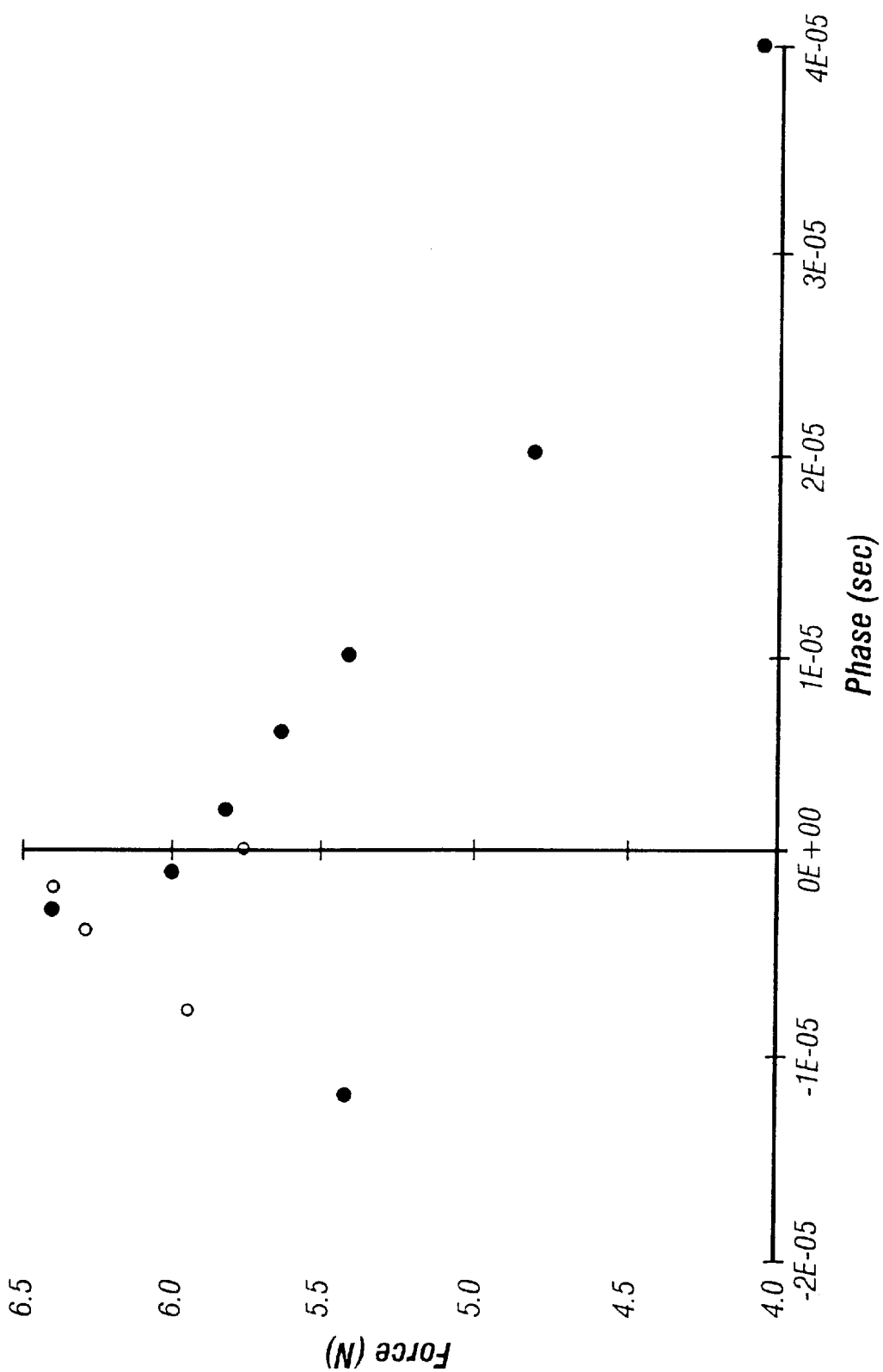
FIG. 18 is a graph depicting the force generated by the single clamping embodiment of the actuator as a function of phase control variation of expandable member and clamp waveforms.

It has also been determined by the inventors that the phase between the voltage waveform of the expandable member and the voltage waveform of the clamping member effects the amount of force that can be supplied by the device. An experimental plot of this information is shown in FIG. 18. It should be seen that usually the phase should be around zero, but some small adjustments may improve certain characteristics.

FIG. 5 shows the control console including a glider control unit 122, expandable member control unit 124, and a relative phase control unit 126. The glider base control unit 122 includes rotatable potentiometer knobs shown schematically as waveform control 128, amplitude control 130, and frequency control 132. These potentiometers correspond to those in FIG. 7 described herein, and it should be understood that control circuit 120 may have more knobs than those shown.

The glider waveform control 128 generally controls the shape of the glider waveform. The voltage amplitude control 130 controls the amount of voltage between the wafer 46 and wafer base 34 to change the amount of electrostatic attraction. Because of the characteristics of the materials, a linear change in voltage amplitude may cause non-linear effects. The voltage amplitude control knob can be weighted, e.g., logarithmically, to compensate for those effects. Frequency control 132 controls the repetitive rate at which the waveforms are produced. For the preferred mode, this frequency is kept between around 10 Hz and 1000 Hz.

The expandable member control unit 124 similarly comprises an expandable member waveform control 134 which controls the characteristics of the waveform applied to the expandable member. For the first embodiment, this waveform should be a slowly rising, but quickly falling waveform. For the second embodiment, the waveform could have any desired characteristics. Adjustable voltage amplitude control 136 controls the amplitude of the voltages used for clamping. The adjustable frequency control 138 changes the frequency of this voltage.

Phase control unit 126 controls the timing between the clamp voltage and the expansion voltage. The preferred timing characteristics are described herein.

Figure 6:
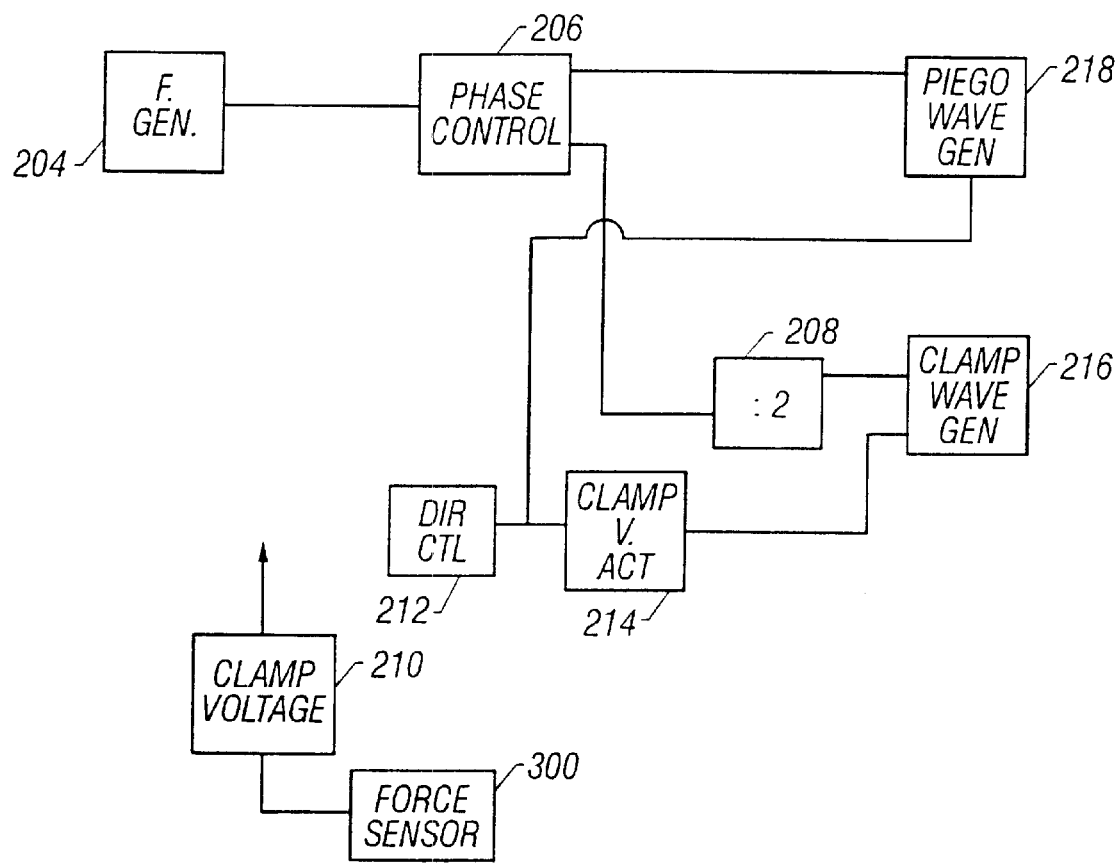
FIG. 6 is a block diagram of the control system of the linear actuator.

A block diagram of the circuit within the control console of FIG. 5 is shown in FIG. 6. Frequency generator 204 produces the frequencies which will be used to drive the linear actuator. These frequencies are adjustable over a certain range. The output of frequency generator 204 is received by phase control unit 206 which produces two outputs, separated in phase by a selectable time. One of the outputs drives the piezo waveform generator 218, and the other output is divided to drive the clamp waveform generator 216. It should be noted that while the preferred embodiment of the invention provides a clamp waveform, it is also contemplated, but less preferred, to drive the motor using a constant clamp voltage. Direction control 212 controls the direction in which the motor is running, and is connected to the piezo wave generator 218, and to the clamp voltage actuator 214 which actuates clamp waveform generator 216.

Clamp voltage device 210 produces the clamping voltage that will be used to clamp the glider to the base. According to a preferred embodiment of the invention, the output of force sensor 300 is used to address the magnitude of this voltage in order to produce a desired amount of force.

As explained above, expandable member 48 expands or contracts as controlled by control console 120. Three separate controllable parameters, expandable member waveform control 134, voltage control 136 and frequency control 138, affect expansion and contraction of expandable member 48. Voltage control 136 generally controls the magnitude of change of length of expandable member 48. Frequency control 138 controls the periodic motion of expandable member 48. Expandable member waveform control generally controls the inertial properties of expandable member 48 and its attached mass load 26.

Figure 7:
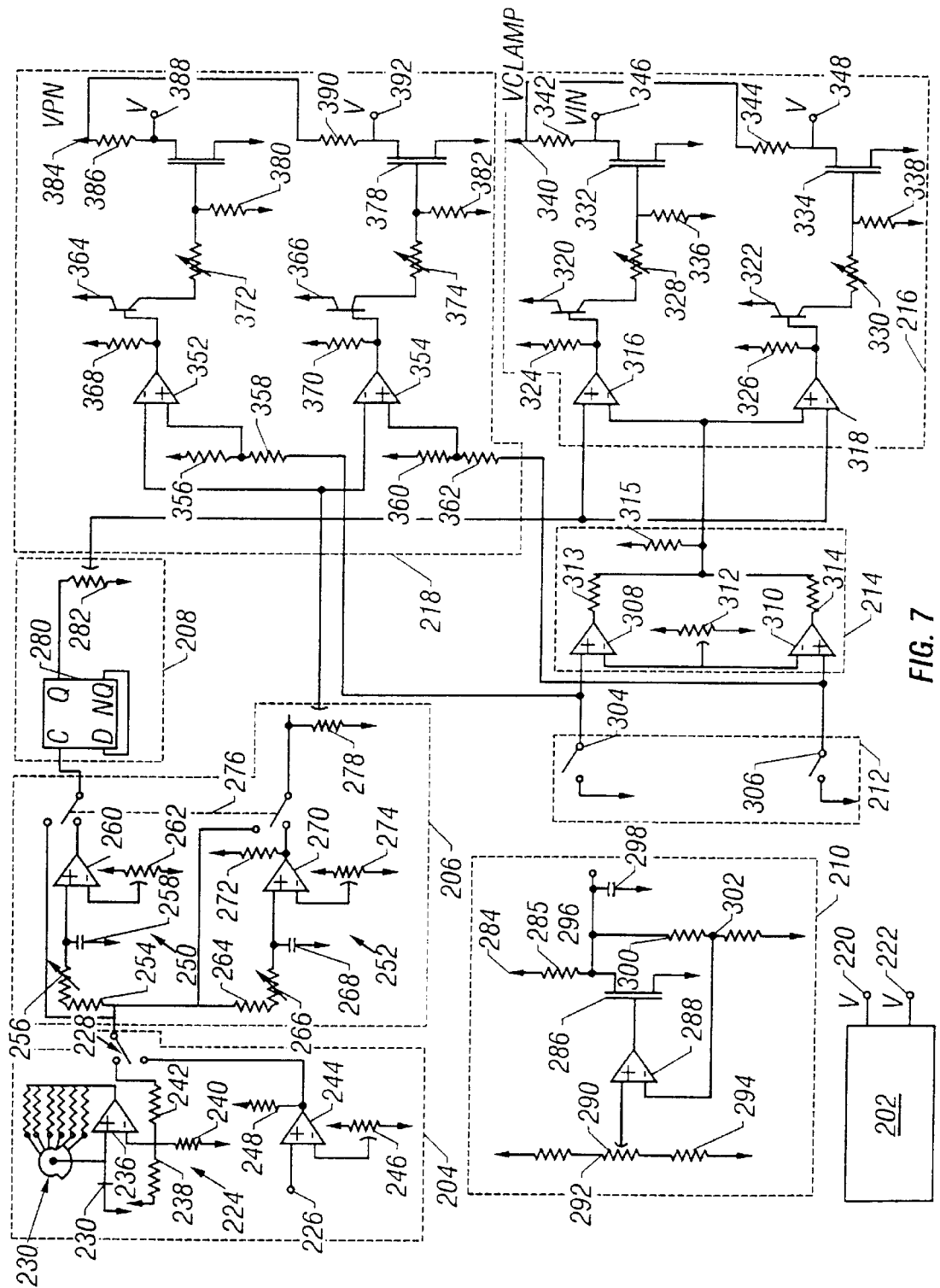
FIG. 7 is an electronic circuit diagram of an exemplary control circuit used according to the present invention.

A specific embodiment of an electrical control circuit for providing control over the parameters discussed above for the first embodiment is depicted in FIG. 7 as control circuit 200. The circuit depicted in FIG. 7 can be wholly or partially fabricated in one of the silicon wafer(s) carried within the linear actuator of the present invention, preferably in the base 30 at area 500, using conventional semiconductor techniques.

DC power supply 202 includes high voltage DC source 220 for energizing and expanding the piezoelectric element and a lower voltage source 222 for driving the logic e.g. at 12V. Voltage source 220 may be variable by the operator and/or by feedback from sensor 300 for achieving the optimal power from the linear actuator. The output value from voltage source 220 may range between 15 and 1000 volts, with the preferred voltage being around 500V.

The frequency generator 204 in FIG. 7 produces a frequency which is used to produce the wafer driving waveforms. Frequency generator circuit 204 includes an internal frequency oscillator 224, and an external input port 226. The internal oscillator 224 uses an operational amplifier oscillator to produce a frequency based on the magnitude of the feedback resistance in the operational amplifier 236. Frequency selector switch 230 controllably switches feedback resistors 232, to form an RC network between those feedback resistors 232 and the capacitor 234. The system oscillates at a frequency dependant on the RC time constant, and hence produces a frequency based on the position of switch 230. Bias resistors 238, 240 and 242 provide a bias voltage to the inverting input of the operational amplifier.

The frequency generator circuit 224 could alternately be a variable divider attached to the output of a crystal, or could be a programmable frequency divider integrated circuit.

In this embodiment, an external frequency can also be added through terminal 226. Operational amplifier 244 compares the input frequency with a DC bias from adjustable resistor 246 to adjust its amplitude to match the characteristics of the system.

The frequencies from external input 226 and from internal frequency oscillator 224 are input to two contacts of switch 228. The output of the switch 228 is passed to the phase shift control unit 206.

Phase shift control unit 206 provides two output frequencies, selected such that the phase lag between those output frequencies has a desired characteristic between 0 and approximate 0.1 $\mu$s. The phase control circuit 250 and phase control circuit 252 each have separately-adjustable delay characteristics. Circuit 250 includes fixed resistor 254 and variable resistor 256 as well as a capacitor 258. The combination of these resistances and capacitances form an RC circuit which delays the rise of the waveform. The RC time constant by varying the value of resistor 256. This delays the passage of the waveform and hence changes the phase angle thereof. Similarly, adjustment of resistor 266 delays the passage of the waveform to the output.

A switch 276 controls whether or not the phase shifting will be used. In a first position, the switch 276 directly connects the inputs of the phase shift unit to the outputs, thereby preventing any phase shift. In the second position, the phase shifts are controllable.

The signal output from circuit 250, either phase-shifted or directly connected, is coupled to frequency divider 208. Divider 208 is simply a D-type flip-flop with its Q not output connected to its D input to thereby divide the input frequency by 2. The output is coupled through a variable resistor. The output voltage is supplied to the clamp waveform generator 216. Of course, this could also be a programmable divide by N counter or any other divider known in the art.

The voltage for the electrostatic clamping of the base to the glider is produced by clamp voltage generator 284. Element 284 includes a voltage divider 290, 292, 294, connected to the inverting input of an operational amplifier 288. The output of the operational amplifier 288 drives the gate of a power MOSFET 286 which has a grounded drain, and a source connected to the output with a bias resistor 285. The source is also directed through a feedback loop with sensor 300 and resistance 302 to the non-inverting input of the operational amplifier. It will be appreciated that operational amplifier 288 is connected as a comparator, and the output thereof determines the voltage drop across the MOSFET 286.

The source of the MOSFET 286 is connected to a filtering capacitor 298 whose output produces the voltage at output terminal 296. This output voltage 296 becomes the clamping voltage.

Element 212 is a motor direction control. By closing one of the two switches, the motor can be selectively reversed in direction. The switches selectively operate the clamp voltage activator 214, which includes comparator amplifiers 308 and 310. Each comparator 308, 310 has its negative input connected to a variable voltage from voltage divider 312. Depending on the positions of the switches 304 and 306, output voltages from the amplifiers 308, 310 are connected to the inverting inputs of operational amplifiers 316, 318 within the clamp waveform generator 216. The positive inputs of these operational amplifiers receive the output voltage from divide by two circuit 208. Each of the amplifier circuits in the clamp waveform generator have a similar construction. Operational amplifier 316 has an output which drives the base of MOSFET 320 which is configured as a follower. The source of this transistor 320 is connected through a variable resistor to the gate of another MOSFET 322, also configured as a follower. The source of the follower-configured MOSFET 322 has an output terminal 346.

Similarly, the circuit including op-amp 318 produces an output voltage at terminal 348. The output terminals 346 and 348 are respectively connected to the glider 46 and wafer base 34. It should be appreciated that by changing the positions of the switches 306, 308, the voltage between those values is also changed to thereby change the direction of operation of the motor.

The other output of the phase control unit, from variable resistor 278, is coupled to the input of piezoelectric element waveform generator 218. This second phase control element is connected to inverting inputs of operational amplifiers 352, 354. The non-inverting inputs of both of these operational amplifiers receive respective signals from the switches 304, 306. The operational amplifiers, configured as comparators, electrically control the gates of MOSFETS 364, 366. These MOSFETS are connected as followers, with the source of each MOSFET connected through a variable resistor 372, 374 and a resistor to ground, 380, 382, to a power MOSFET 376 also connected as a follower. The sources of MOSFETS 376 and 378 produce voltages which are coupled to output terminals 388, 392. These terminals are connected to the electrical leads 54, 56 and thereby control the expansion and contraction of expandable member 48.

In operation, the circuit of FIG. 7 produces voltage waveforms for the electrostatic clamp(s) and the expandable element. When switch 304 is closed, the respective amplifiers 352 and 308 are turned on thereby applying a specific voltage to amplifiers 316 and 318. These voltages are applied to operational amplifiers 316, 318 in clamp waveform generator 216. The other inputs of the operational amplifiers are driven by the output of the divide by 2 divider 208. This results in a continuously-reversing voltage across the output terminals 346, 348 at half the frequency of driving of the expandable member. The actual shape of the voltage curve depends on the RC time constant controlled by using variable resistors 328, 330. Closure of switch 306 turns on the opposite-sense voltage drivers.

Switches 304 and 306 also control the operation of the piezoelement waveform generator 218. When both switches 304 and 306 are open, waveform generator 218 is idle. Closing switch 304 also provides a low level voltage to the positive input of operational amplifier 352, thereby turning it on and allowing it to pass the output voltage received from the phase control 206. Alternately, switch 306 turns on the amplifier 354, thereby allowing it to operate using that same voltage. It can be seen that the overall effect of closing switches 304, 306 is to control the direction of motion of the linear actuator. By just closing switch 304, the waveform generator circuit that powers MOSFET 376 is initiated. By closing switch 306, the waveform across terminals 388 and 392 is inverted.

As described above, velocity of the actuator is controlled by changing the frequency output signal from frequency generator 204. However, for any given input power, the velocity output must be traded off against work load. The expandable member voltage most directly controls the power. The clamp voltage controls the tradeoff between speed and force. A low clamp voltage allows a higher speed but less force. Since the clamp voltage is lower, the clamping force between the glider and the base can be maintained only for a lower amount of force. However, since the clamping force is relatively lower, the inertial snapback operation allows the glider to move forward a little further.

The relationship between velocity and force is more complicated and less linear. The characteristics are more easily modelled, which has been done by the inventors and will be explained with reference to the following preferred embodiment.

The linear actuator of the present invention uses a piezoelectric element which is preferably 38.1 mm in length. The preferred piezoelement width is 6.35 mm. This provides a preferred clamp surface area of 234 square millimeters. The preferred thickness is 0.8 mm. More generally, however, the actuator can be between 1 and 250 mm in length, between 0.1 and 50 mm in width, and 0.01 to 5 mm in thickness.

The preferred piezoelement has a mass of 1.4 grams, although it can range between 0.01 and 450 grams. The preferred glider mass is 30 grams, although it is conceivable to make the glider mass between 1 gram and 10 kilograms.

Figure 1A:
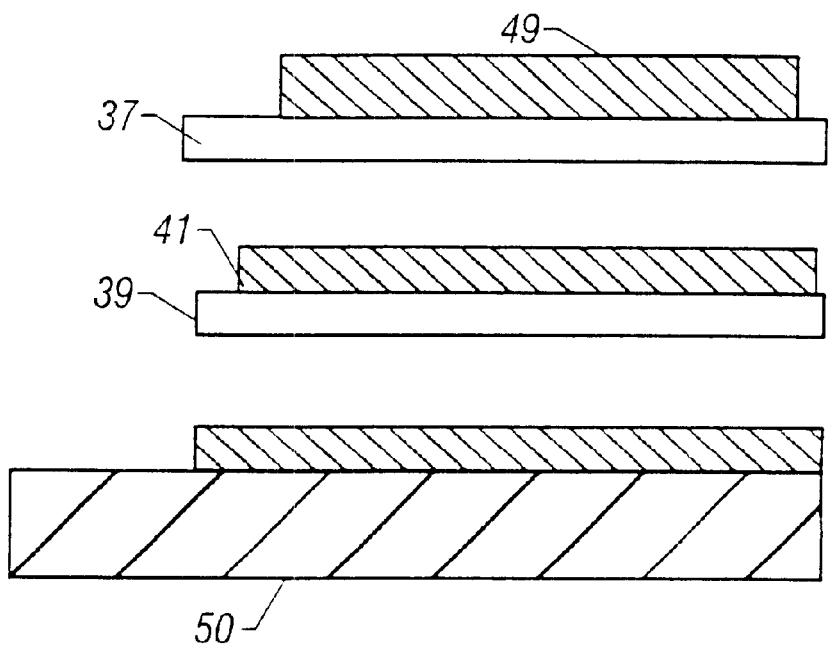
FIG. 1A is a sectional view of the layers forming the moving parts of the first embodiment.

The insulating layer 39 is preferably formed of $SiO_2$ and $Si_3N_4$ as shown in FIG. 1A. Preferably, the $SiO_2$ layer has a thickness of about 0.75 $\mu$m and the $Si_3N_4$ layer about 0.15 $\mu$m. Both layers could be as thick as 2–3 $\mu$m or as thin as 50 Å.

The silicon clamping wafer preferably has a thickness of 0.036 mm, but more generally between 0.01 and 1 mm.

The system operates according to the following preferred parameters:

| PARAMETER | PREFERRED | MINIMUM | MAXIMUM |
| --- | --- | --- | --- |
| Electrostatic Clamp Voltage | 300 volts | 30 volts | 2000 volts |
| Piezoelectric Drive Voltage | 500 volts | 15 volts | 1000 volts |
| Drive Frequency | 400 Hz | 0.1 Hz | 3000 Hz |
| Silicon Clamping Wafer Resistivity | 1 ohm-cm | 0.001 ohm-cm | 100 ohm-cm |
| Incremental Step Size | 6.25 $\mu$m | 0.01 $\mu$m | 50 $\mu$m |
| Velocity | 0.25 cm/s | 0 cm/s | 2 cm/s |
| Electrostatic clamping force | 10 Newtons | 0 | 500 Newtons |
| Output Force | 6 Newtons | 0 | 100 Newtons |

Figure 8:
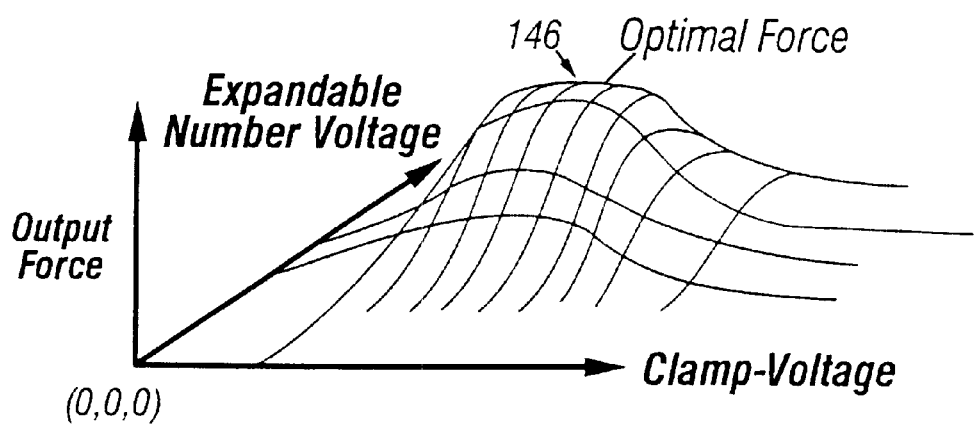
FIG. 8 is a graph depicting output force of an exemplary actuator as a function of clamping voltage and expandable member voltage.
Figure 9:
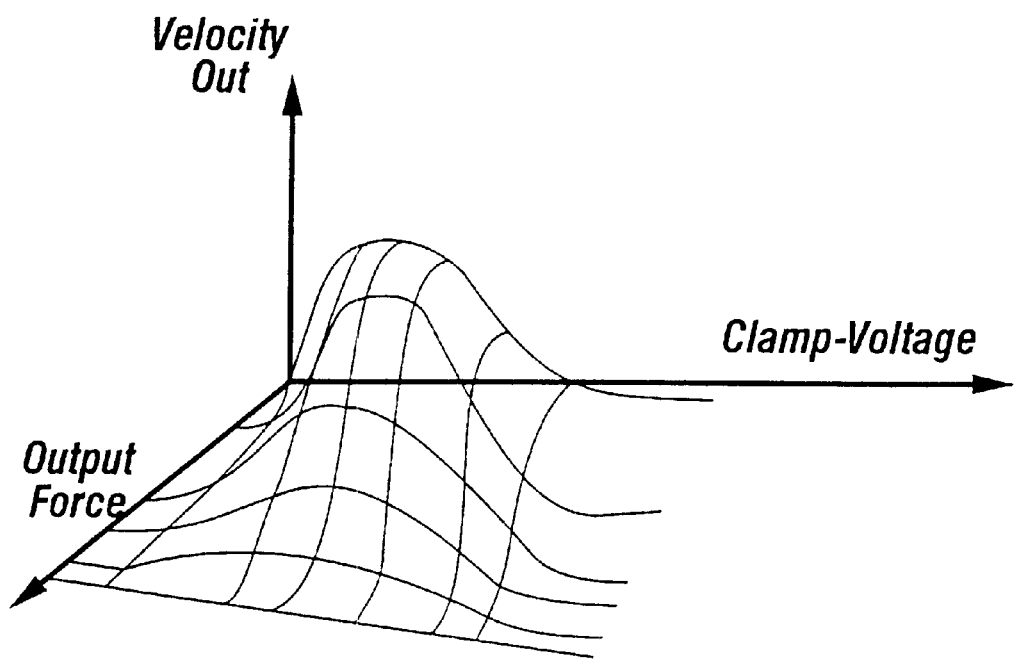
FIG. 9 is a graph depicting the velocity of the linear actuator as a function of the clamping voltage and output velocity.

It should be apparent from the above that the performance characteristics of the linear actuator are dependent on the physical properties of the system. FIGS. 8 and 9 show general performance envelopes for a linear actuator, it being understood that the absolute values of the curves could depend on the actual loads and inertial masses chosen in the clamp surface areas. The point of FIGS. 8 and 9 is that for each mass range and clamp area, a different set of curves define the performance envelopes, and values on these curves can be chosen to optimize different characteristics.

By specifying different values for any given application, usually the largest inertial mass and clamp surface area will be selected. FIG. 8 shows the output force reaching its optimum value at point 146. An increase in clamp voltage initially produces a higher output force because it causes the glider wafer to be more tightly held in place as the expandable member is expanded. Too much clamping voltage, however, lowers the output force, because it prevents the expandable member from moving forward when the expandable member voltage is released. The clamp surface area and voltage are related to one another, and as the clamp surface is increased, the voltage necessary to produce the same amount of clamping force decreases.

FIG. 9 shows a similar relationship between the force and clamping voltage. A peak velocity can be selected by adjusting the clamp voltage. However, when the clamp voltage becomes too high, the velocity begins to drop because of the increased difficulty in overcoming the clamping force to move forward. The output force also increases with increased voltage.

The step length is a function of the elastic limit of the expandable material and of the voltage applied to the expandable material.

As can be seen from the drawings of FIG. 8, optimum force and velocity can be separately set, and the values may need to be set at different values to achieve different results.

Figure 10:
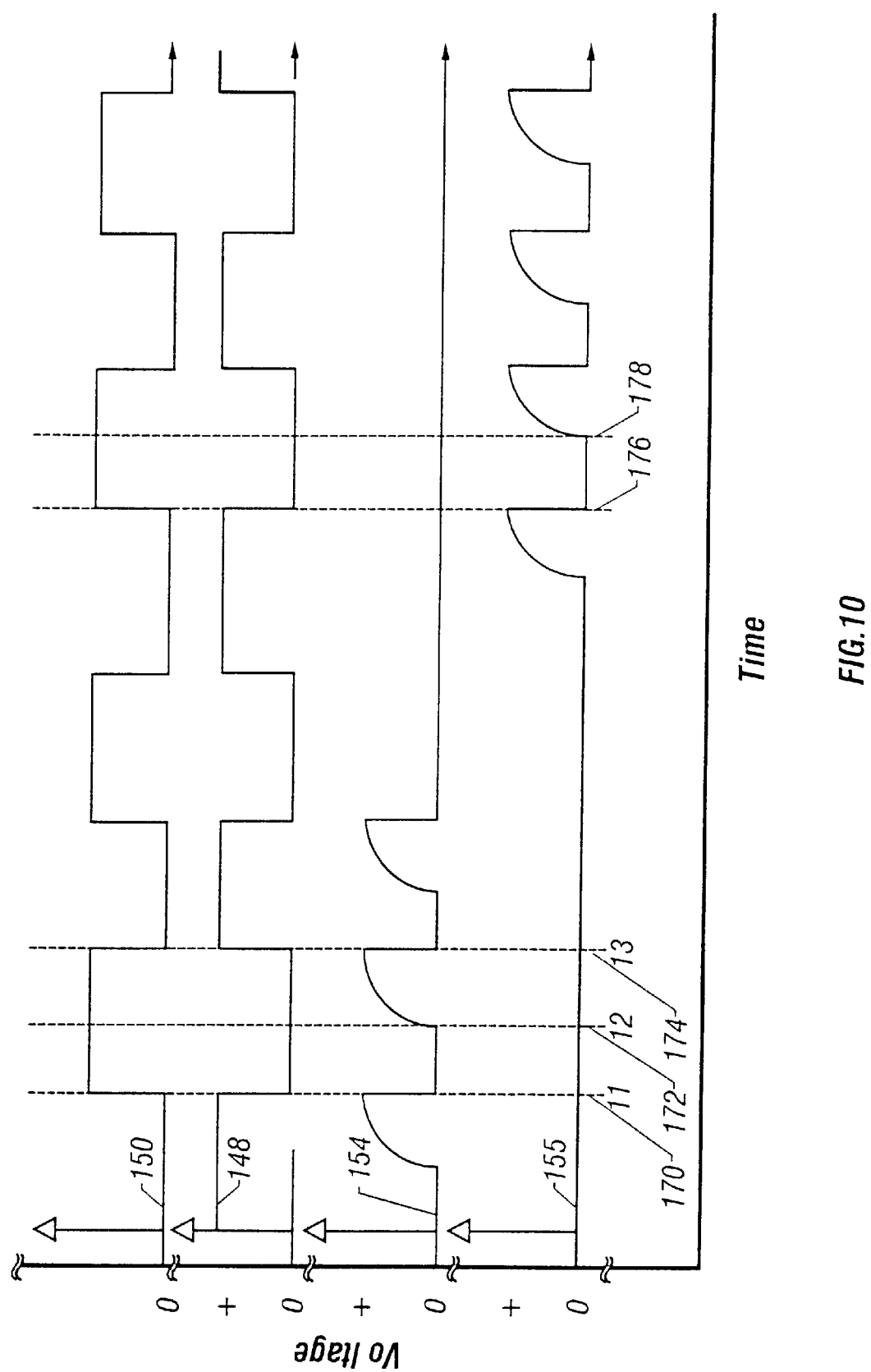
FIG. 10 is a timing diagram for the first embodiment.

FIG. 10 shows a typical set of waveforms generated by the control console 120 for control of the actuator of the preferred mode of the first embodiment of the present invention. For purposes of this time chart, we assume that the expandable member 48 is oriented such that when the voltage on electrical lead 54 is positive, member 48 is expanded in length.

Voltage 148 represents the voltage applied to the wafer base, and voltage 150 represents the voltage on the glider. The voltage difference between voltages 148 and 150 represents the clamping voltage. According to one mode of the present invention, the clamping voltage is simply kept at a constant value at all times. This produces satisfactory results, but is less preferred than the technique described herein.

It was found by the present inventors that when a constant clamping voltage was maintained at all times, this caused buildup of charge across the elements and also caused increased attraction between the wafers, causing the separation distance between the glider 24 and base 22 to decrease. According to the preferred mode of the present invention, the voltage across the glider and base is maintained for a relatively short time, e.g., 1–4 ms. At the end of that 1–4 ms time, the voltage across the glider/base is reversed in polarity. This causes a momentary time during which the voltage across the glider base approaches zero. At this time, the glider and base separate slightly, followed by an increased attraction. This increased attraction, however, has opposite sense charge layer characteristics so that charge buildup is avoided.

Turning then to the time chart, prior to point 170, the time chart shows that the voltage between the glider and the base is negative: that is, the voltage on the glider is less than the voltage on the base. At time point 170, the voltage across the electrical leads are reversed. This momentarily loosens the electrostatic clamping force between the clamping wafer 46 and the wafer base 34, but essentially immediately re-tightens the clamping force. At this point, the voltage 154, which is the voltage controlling the expansion of the electrostatic element, is dropped to zero as quickly as possible. This causes a quick contraction of the expandable member within hundreds of nanoseconds. As described above, the quick contraction causes the glider to overcome the clamping force and move slightly forward.

At time point 172, voltage 154 begins slowly increasing. This causes a slow increase in the length of the expandable member 48. This slow increase pushes forward the mass load rather than overcoming the clamping force. When the expandable member 48 is completely expanded, at time 174, the voltage across member 48 drops to zero again, thereby repeating the previous step causing a further forward movement.

By repeating these steps, the system has a continuously-intermittent forward motion. Backward motion is carried out the opposite of the forward motion as shown on the negative sense line 155, at time 176 etc.

Figure 11:
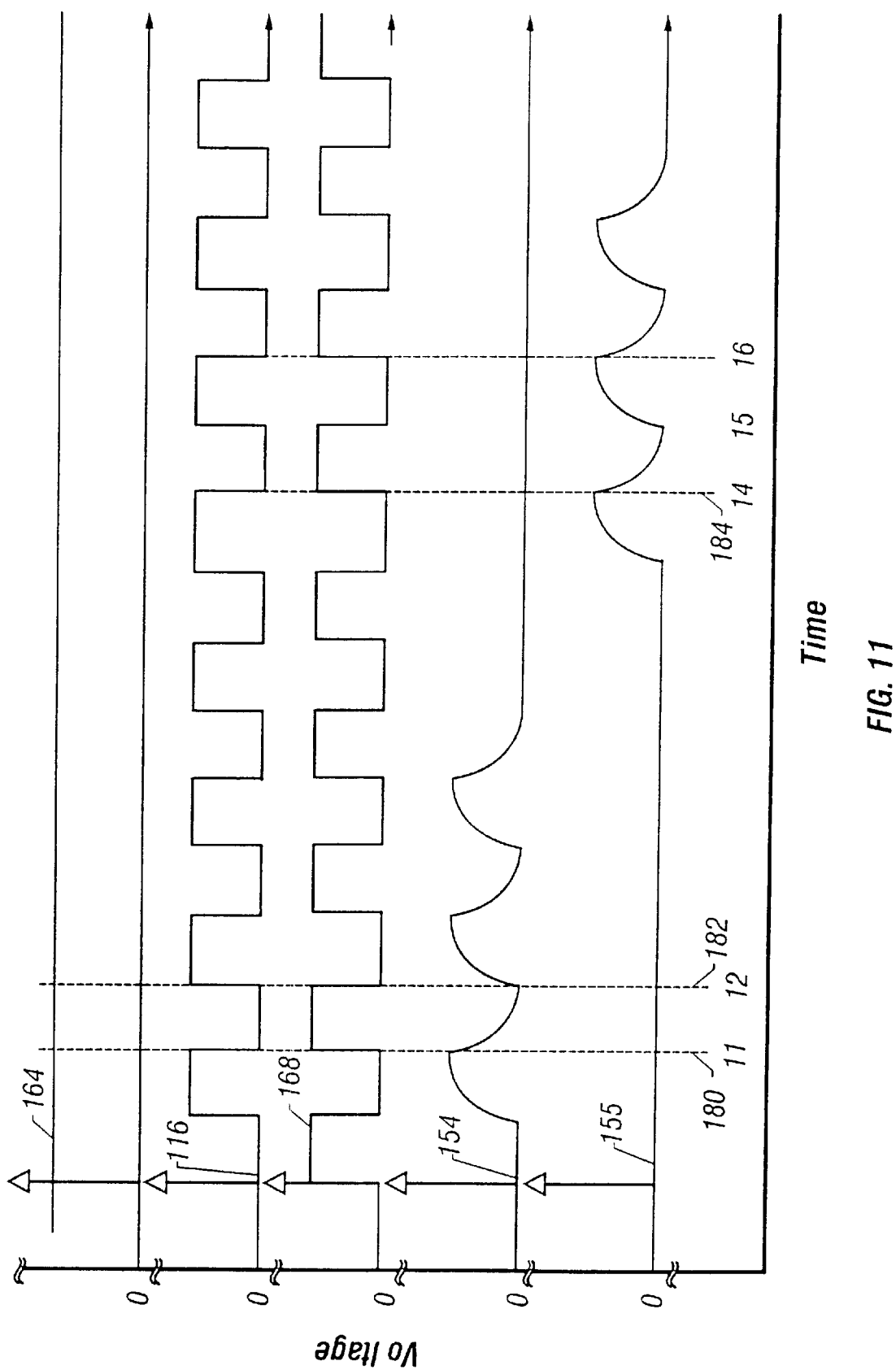
FIG. 11 is a timing diagram for the second embodiment.

The waveforms for the second embodiment are slightly different and are shown in FIG. 11. One cycle may be considered to begin at time point 180, when the voltage potential on the curve 166, which represents the potential on the electrical lead 90 driving the proximal glider 86, is dropped to zero. At the same time, the voltage on line 168, connected to the distal glider 84, rises. This allows the proximal glider 86 to slide freely relative to the wafer base, but clamps the distal glider 84 relative to the wafer base.

At this time, the voltage 154, which drives the expandable member 48 is reduced, so that the expandable member contracts in size. Since the distal glider has been clamped, the proximal glider 86 is moved to the right in FIG. 4. After full contraction, at time 182, the voltages are reversed, with the distal glider being freed, and the proximal glider being clamped. The voltage across the expandable member 48 then increases, causing the distal glider to move to the right in FIG. 4. Of course, opposite direction motion is carried out using precisely the opposite steps.

FIGS. 12–18 show the interrelationships between clamping voltage, expandable member voltage, voltage amplitude, waveform, frequency, phase angle difference and clamping force. FIGS. 12–18 show actual values for specific prototypes used according to the present invention.

Figure 12:
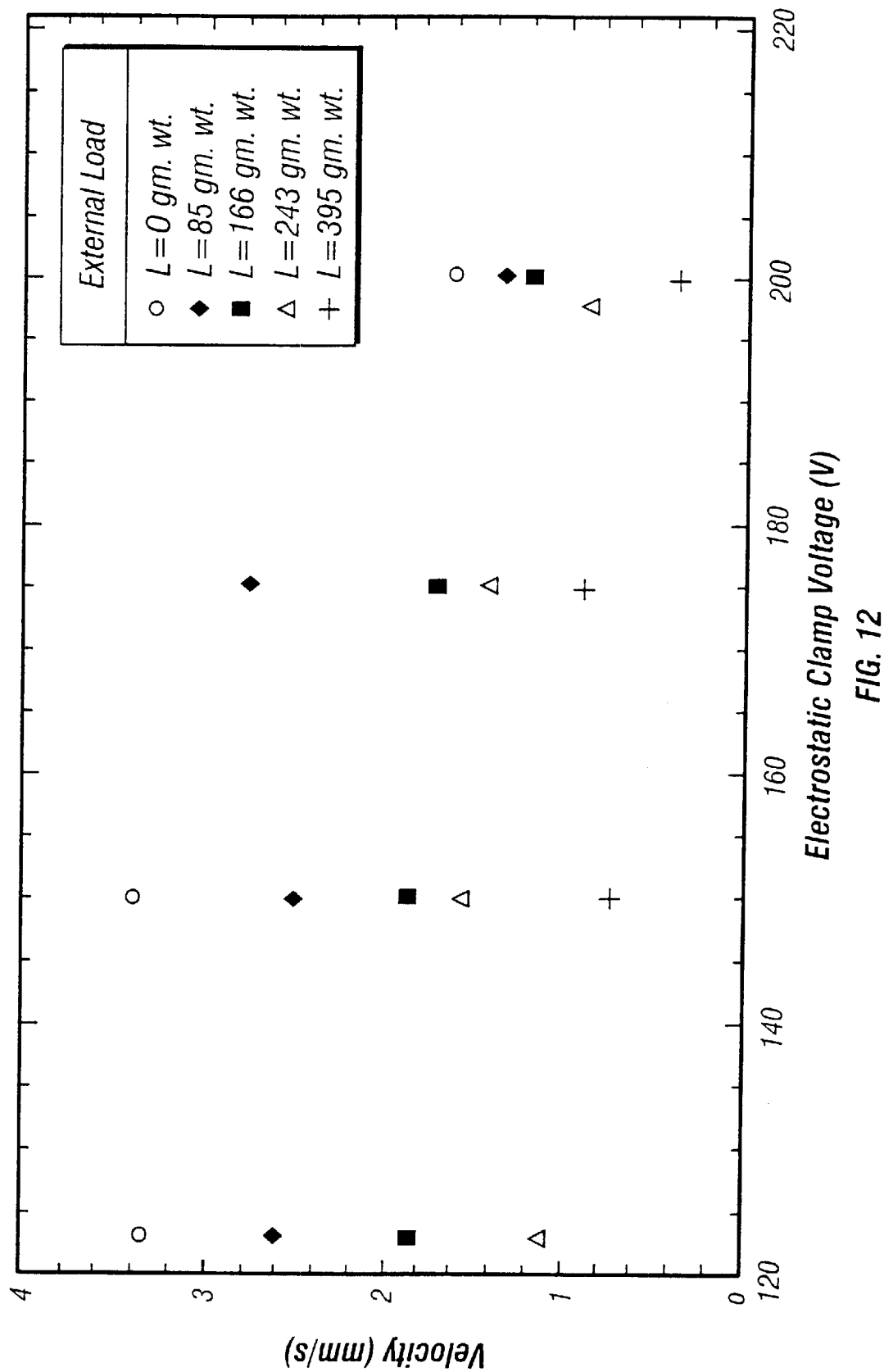
FIG. 12 is a graph depicting the velocity of the single clamping embodiment of the actuator as a function of clamping voltage for a variety of load sizes.

FIG. 12 shows the velocity of an element plotted as a function of electrostatic clamp voltage for various external loads. For each design, there is an optimum range where too little or too much clamp voltage produces inferior results. If the clamp voltage is too low, e.g., less than 50 volts as shown in FIG. 13, then no movement may be possible at all.

Figure 13:
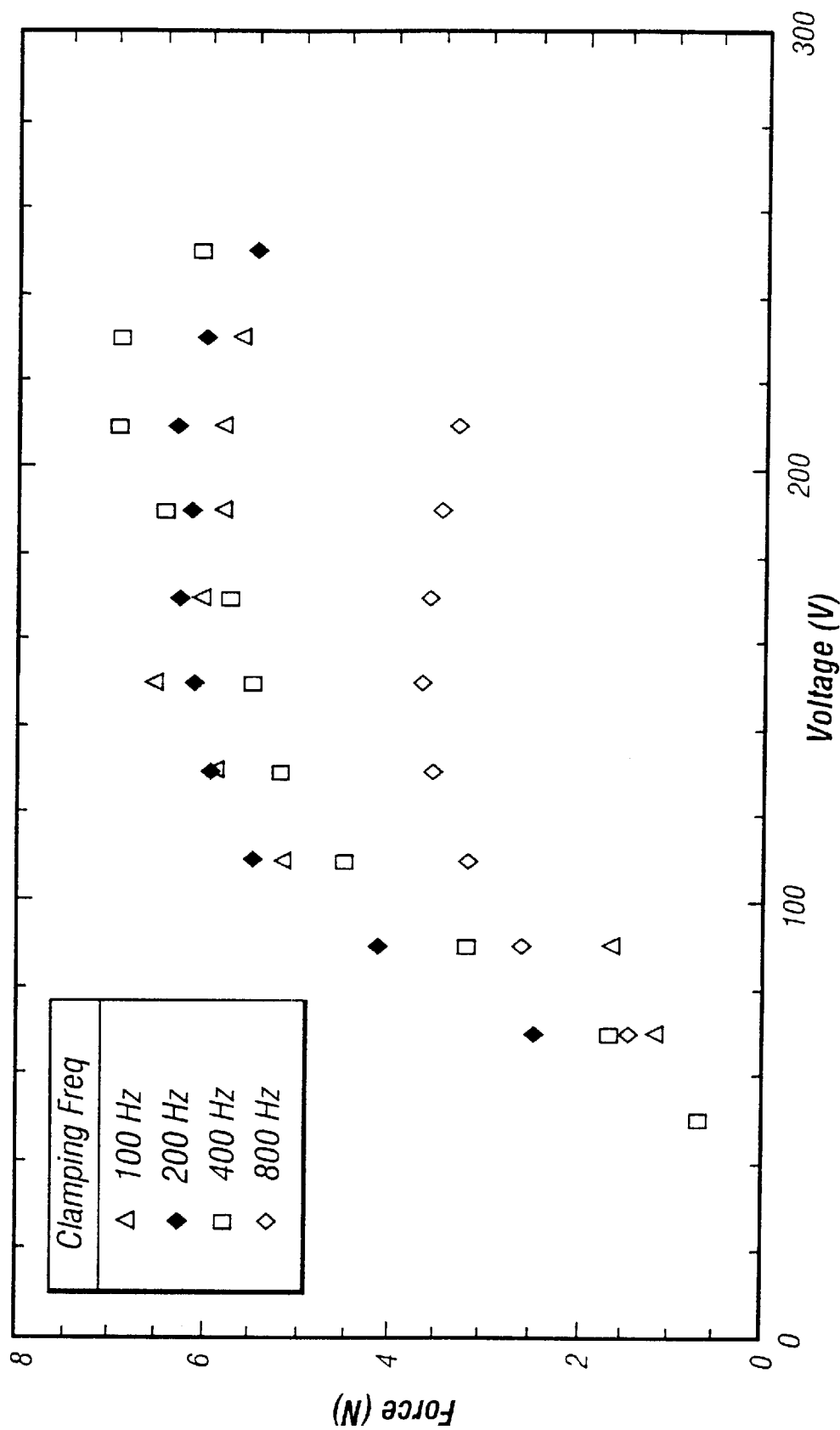
FIG. 13 is a graph depicting the force generated by the single clamping embodiment to the actuator as a function of clamping voltage for a variety of clamping frequencies.

FIG. 13 shows the output force plotted as a function of electrostatic clamping voltage for various clamping cycle frequencies. The clamp voltage increase produces an output force which increases until it plateaus. Lower frequencies have less overall effect than the highest frequency tested. The control frequencies of the voltage inputs to the expandable member and the clamping wafer generally control the repetitive rate of actuator steps.

Figure 14:
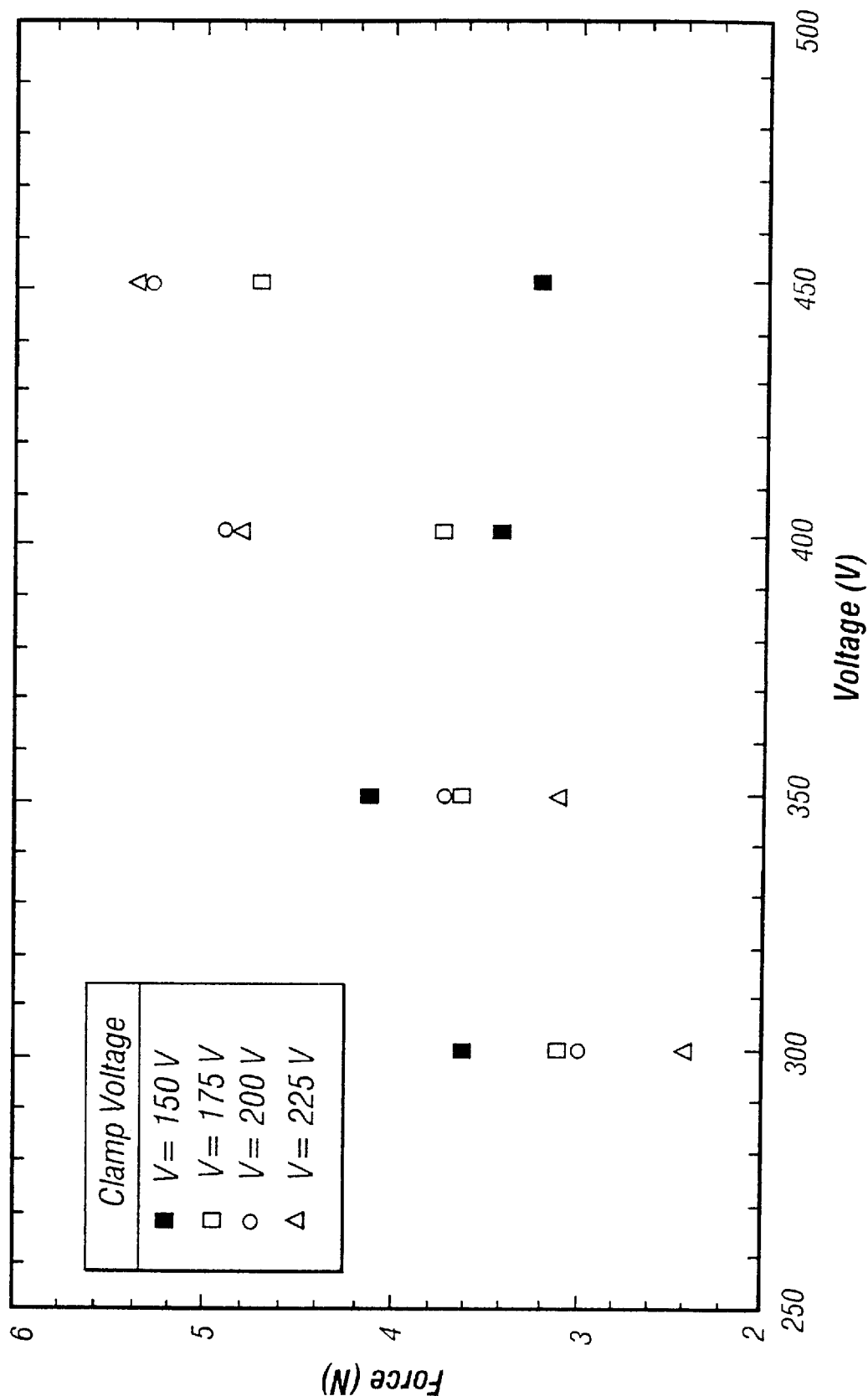
FIG. 14 is a graph depicting the force generated by the single clamping embodiment of the actuator as a function of expandable member voltage for a variety of clamping voltages, with the phase between the clamping voltage and expandable member voltage as depicted in FIG. 8.

FIG. 14 shows a plot between the voltage applied to the expandable member and the force produced for various clamping voltages. It should be seen that for the different clamping voltages, different expansion voltages for the piezo electric element are possible.

Figure 15:
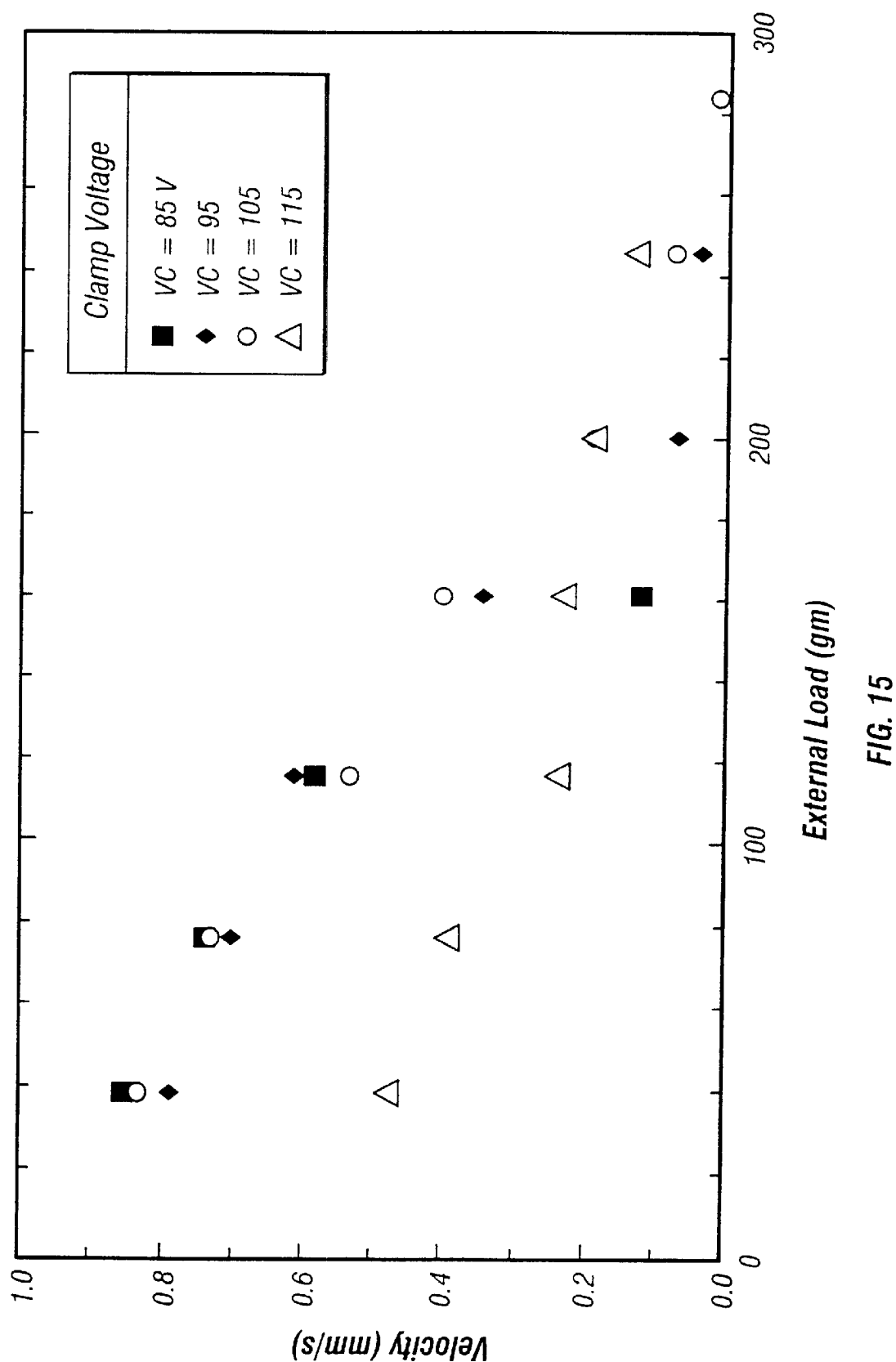
FIG. 15 is a graph depicting the velocity of the single clamping embodiment of the actuator as a function of external load for a variety of clamping voltages.

FIG. 15 shows a relationship between the velocity and the mass of the external load for different clamp voltages.

Figure 16:
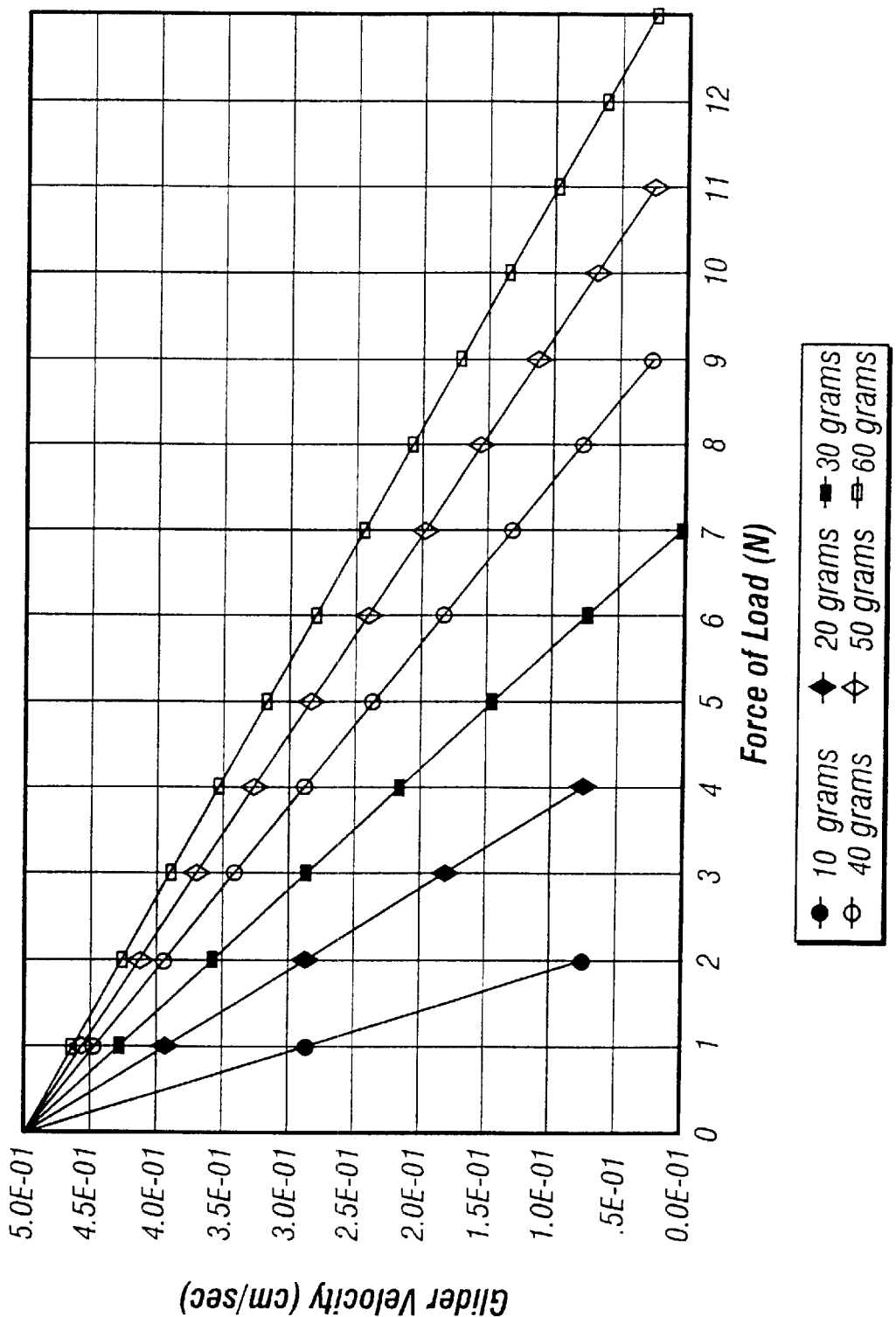
FIG. 16 is a graph depicting an estimate of glider velocity of the single clamping embodiment of the actuator as a function of load force for a variety of glider weights.

FIG. 16 shows a three dimensional plot between the velocity, the loading, and the force of the load.

Figure 17:
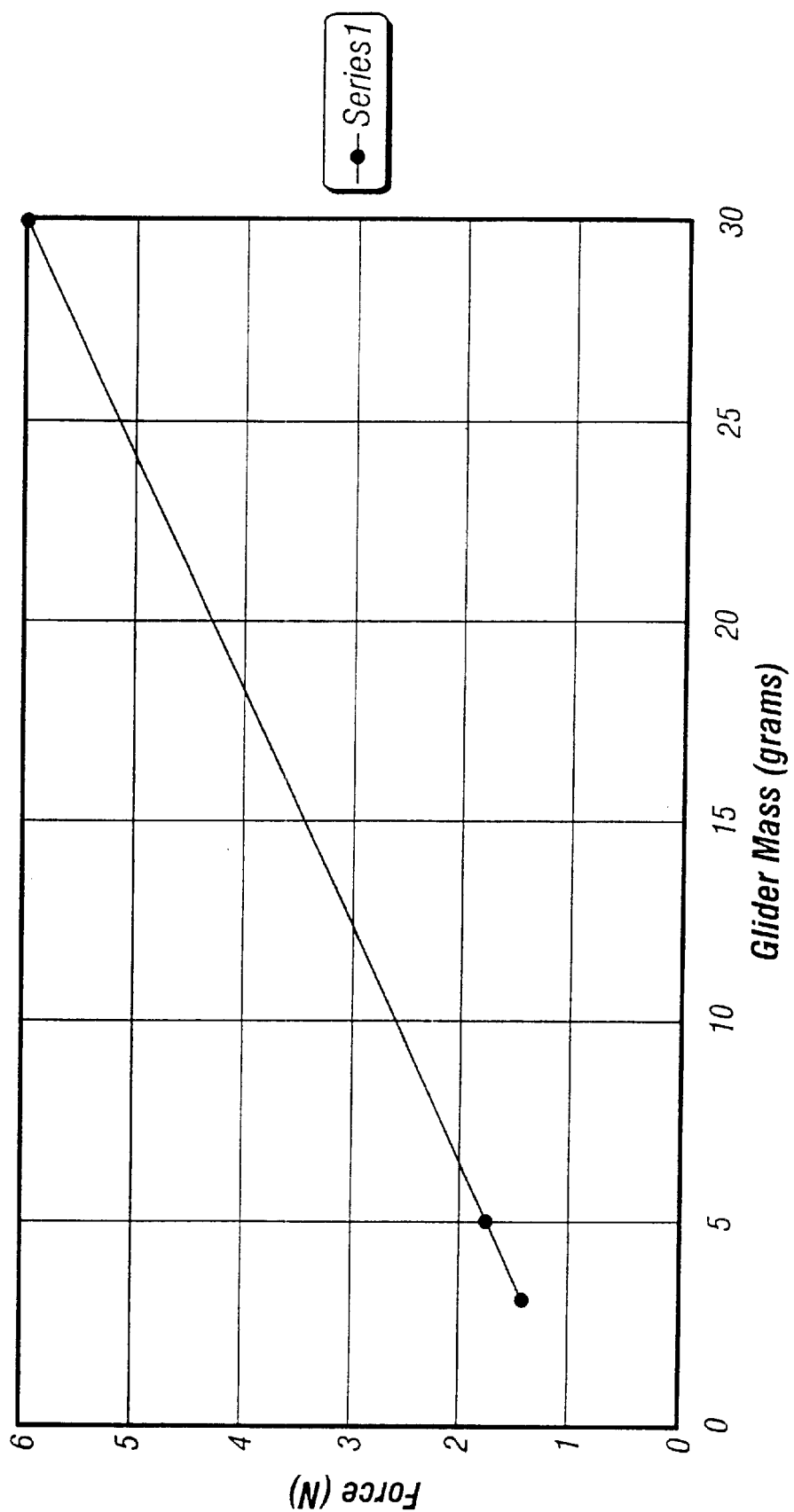
FIG. 17 is a graph depicting the force generated by the single clamping embodiment of the actuator as a function of glider mass.

FIG. 17 shows the force as a function of glider mass data, showing that the output force increases linearly, at least over a specified range, with the glider mass.

FIG. 18 shows a plot of the force versus phase of the PZT clamps.

FIGS. 8, 9 and 12–18 show the large range of operating characteristics that are controllable by way of mathematical and experimental modeling which produce an application-specific design procedure. The actual use of a linear actuator constructed according to the present invention yields a required total displacement, a minimum step size, a maximum velocity, a volumetric size constraint and a maximum force. The design procedures include prediction of whether such a set of constraints can be satisfied and then guide the design of a complete linear actuator, according to the present invention for that task.

Another advantage of the present invention is the ability to control motion by either displacement, force or a combination of both. Traditional linear motors can only be driven by specifying displacements because there is high mechanical impedance between the motor and the workpiece, i.e., the load created by the work piece at the distal end of the linear motor. For example, in the case of a rotary motor driving through a rotary-to-linear coupling, such as a worm and worm gear, even medium levels of force at the distal end are not transmitted back to the motor due to the mechanical advantage of the high gear ratio. This condition renders force control impossible without extra sensors added to the distal end to workpiece interface.

The present invention preferably uses sensor 300, which senses force or displacement and feeds back a signal indicative thereof. Alternately, however, controller 120 may directly sense any load changes on work interface 64 from a workpiece through monitoring voltage, current and phase angle changes. Controller 120 can be programmed to automatically respond to these changes through feedback mechanisms to adjust one or more settings for the following: glider waveform control 128, voltage amplitude control 130, adjustable frequency control 132, expandable member frequency control 138, and phase control 126. Thus, a specific force/displacement relationship can be maintained within the power and mechanical limits of the system.

The device of the present invention is capable of small precision steps in the range of 10–30 nanometers throughout the entire displacement range of the device which can be between 3.3 cm and 12 cm. The actual theoretical displacement is limited only by the length of the wafer base. However, according to another preferred modification of the present invention, glider 24 is connected to casing C by a spring which limits the length of movement of the glider relative to the base. This spring can preferably bias glider into a specific position; whereby when the clamping force is released between the glider and the base, the spring biases the combination back to a zero position.

The preferred device fits within a ⅜ inch tube, but still produces 1.2 foot pounds of force over its range.

The inventors of the present invention tested the above-described linear actuator, and found that failures occasionally occurred therein, although the general concept was quite sound. After extensive tests, the inventors had concluded that the SiN surfaces would be the most wear-resistant surfaces. However, after expensive testing they found that if both surfaces were formed of the same material, those surfaces tended to stick to one another over time. When the two surfaces were made of dissimilar materials, they did not stick.

After testing special materials, the inventors decided that the base material should be polished silicon and that the clamp material surface should be SiN, more preferably a silicon wafer with a 500 Å thick silicon dioxide layer, covered with 2000 Å of SiN. In this way, the SiN layer slides relative to the silicon base. Although the silicon base may oxidize over time to form an SiO2 layer, the two materials in contact would always be different materials.

Another problem was found in the way the materials were made. The silicon wafers are made as long wafers, and cuts are made to seperate the silicon wafers using a mechanical cutting saw. This, however, caused chips on the silicon wafer. Each of these chips formed a sharp edge. This sharp edge tended to cause arcing, especially when the high voltage and high frequency voltages were applied.

The inventors obviated this problem by changing the cutting technique. The silicon wafers are 400 $\mu$m thick. A diamond saw is used to cut a trench 25 $\mu$m wide and 300 $\mu$m in depth into this silicon wafer. The 300 $\mu$m trench goes ¾ of the way through the material. The materials are snapped apart at this trench. The facing surface of these materials is the cut part, not the snapped part. This cut part has no chips or rough edges thereon, and therefore no arcing or sparking occurs when the final unit is formed.

Figure 19:
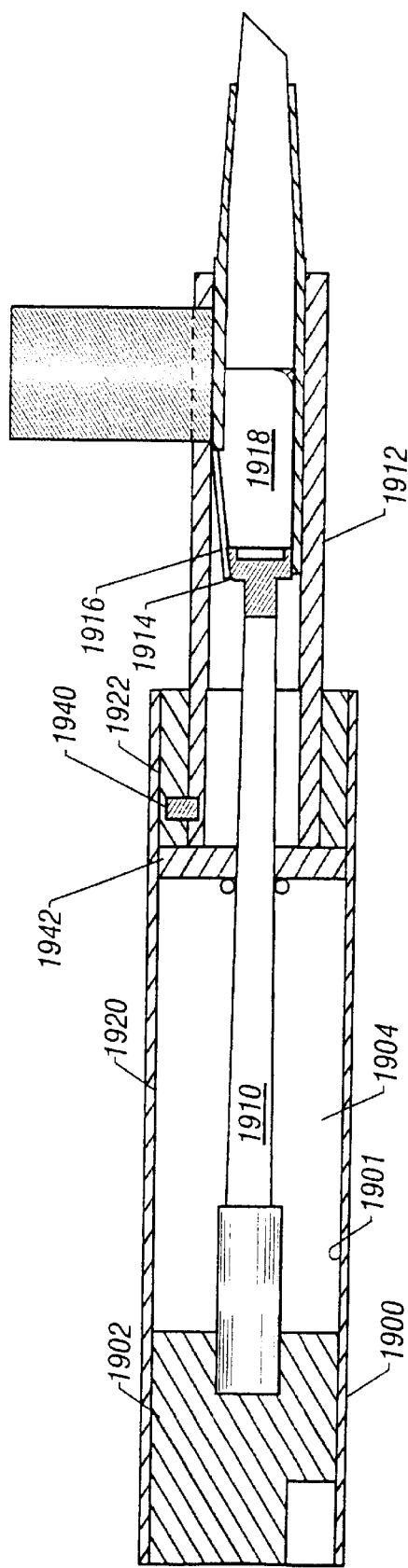
FIG. 19 shows the lens delivery device part of the linear actuator of the present invention.

FIG. 19 shows a first lens delivery tip of the present invention. The mass loading arm 64 according to this preferred mode pushes on a force-delivering element, moving mass 1900. Element 1900 is moved within the chamber 1902 by the motion of the stepper motor.

Any surgical element, and especially an eye surgery element, is used in a moisture-intensive environment. The inventors found that the preferred rotary motor of the present invention, however, would not operate properly once moist. To overcome this problem, an O-ring seal 1901 seals between the movable piece and the casing to avoid liquid seepage into the motor during sterilization. O-ring 1901 must be located in a cylindrical area to ensure the best seal, and the farther forward the better. O-ring is shown sealing between the pushing element 1910, and the guide element 1912. O-ring 1901 could alternately be located behind mass 1900.

Chamber 1902 also includes a ridge area 1904 thereon which engages a corresponding notch 1906 within the force delivering area 1900. This prevents any rotary torque. The ridge is preferably formed of a minimal friction material, such as teflon, to ensure smoothest possible forward and reverse motion. The ridge 1904 prevents placement of O-ring 1901 at a location close thereto.

A pushing element 1910 includes a rod which is movable through guide element 1912, within which the shaft 1910 passes.

The end of the shaft 1910 includes a pusher element 1914 which fits within the inside of lens cassette 1916. Pusher element 1914 presses against lens 1918. As the arm is pushed forward by the motor, the cylindrically-rolled lens is pushed through the cylindrical delivery shaft 1930, and finally into the eye.

According to the present invention, the materials used to deliver the lens in the eye are formed of a number of connectable pieces. The housing portion is formed of a cylinder 1920 and an attachment portion 1922. Attachment portion 1922 is shown in more detail in FIG. 20. It includes a notched groove 1924 thereon. The detachable delivery piece 1940 includes a peg 1942 which fits within the notched groove 1924, and twists therein to maintain contact therebetween. The lens delivery cassette 1950 fits within the lens delivery device 1960 which includes lens delivery tube 1930. The cassette element 1950 fits within an appropriate groove 1944 within the delivery device 1940.

Lens 1918 is shown in FIG. 23 in the unfolded condition, and in FIG. 24 in the folded condition. The folded lens fits within the cassette 1950. The plunger 1914 pulls the lens from the cassette and pushes it into the eye.

A second, and currently preferred, embodiment of the lens delivery system is shown in FIGS. 26a–26d. The moving mass 2600 has a special shape. The push rod 1910 includes an insulated non-conductive insert 2602. This insert has a non-conductive portion 2604, formed of insulating material, which is screwed into the moving mass 2600. The rod 1910 has a threaded area 2606 which is screwed into the insulated area. This non-conductive insert protects the rod from receiving any charge from the stepper is motor. Otherwise, residual charge might conceivably creep into the rod.

Moving mass 2600 moves back and forth within the chamber 1902. In this embodiment, the element is sealed at location 2610 by an O-ring 2612. An attachment mechanism, including at least tip 1930 is removable from the O-ring portion 2612.

Although only a few embodiments have been described in detail above, those having ordinary skill in the art will certainly understand that many modifications are possible in the preferred embodiment without departing from the teachings thereof.

For example, mechanical equivalents for the electrostatic clamps may be used. Mechanical biasing methods for increasing the friction at the glider wafer to base wafer interface would have the advantage of providing the performance achieved with continuous electrostatic clamping. In addition, the substitution of mechanical biasing methods could eliminate the additional electronic controlling required by the electrostatic clamps.

All such modifications are intended to be encompassed within the following claims.

What is claimed is:

1. A method, comprising:
    a first voltage waveform which varies over time to a first member having a substantially smooth surface to produce an attraction force between said first member and a second, expandable member according to a magnitude of said first voltage waveform at any given time; and
    applying a second voltage waveform which varies over time to said second member, to control expansion and inertial properties of said second member, and to cause said second member to move in a specified direction relative to said first member.

2. A method as in claim 1, wherein said first and second voltage waveforms are out of phase by a specified amount.

3. A method as in claim 1, further comprising monitoring an amount of force delivered by said second member and changing some characteristic of one of said voltage waveforms to set a desired amount of force.

4. A method as in claim 1, further comprising adjusting a direction of movement of said second member relative to said first member.

5. A method as in claim 1, further comprising adjusting said waveforms to change a velocity output of said second member.

6. A method as in claim 1, further comprising increasing speed but lowering force, by lowering a clamp voltage.

7. A method as in claim 1, further comprising decreasing speed and increasing force, by increasing a clamp voltage.

* * * * *